US009311389B2

(12) United States Patent
Yang

(10) Patent No.: US 9,311,389 B2
(45) Date of Patent: Apr. 12, 2016

(54) FINDING INDEXED DOCUMENTS

(75) Inventor: Dong Yang, Hangzhou (CN)

(73) Assignee: Alibaba Group Holding Limited (KY)

( * ) Notice: Subject to any disclaimer, the term of this patent is extended or adjusted under 35 U.S.C. 154(b) by 840 days.

(21) Appl. No.: 13/484,174

(22) Filed: May 30, 2012

(65) Prior Publication Data

US 2012/0310915 A1   Dec. 6, 2012

(30) Foreign Application Priority Data

Jun. 2, 2011   (CN) .......................... 2011 1 0147520

(51) Int. Cl.
*G06F 17/30* (2006.01)

(52) U.S. Cl.
CPC .... *G06F 17/30678* (2013.01); *G06F 17/30622* (2013.01)

(58) Field of Classification Search
CPC ..................... G06F 17/30622; F06F 17/30678
USPC .................................................. 707/705, 706
See application file for complete search history.

(56) References Cited

U.S. PATENT DOCUMENTS

| | | | |
|---|---|---|---|
| 5,748,953 A * | 5/1998 | Mizutani et al. | |
| 5,913,206 A | 6/1999 | Chaudhuri et al. | |
| 5,920,854 A | 7/1999 | Kirsch et al. | |
| 7,392,278 B2 * | 6/2008 | Chen et al. | |
| 7,536,408 B2 | 5/2009 | Patterson | |
| 7,797,299 B2 * | 9/2010 | Thrasher | 707/706 |
| 7,831,601 B2 | 11/2010 | Oral et al. | |
| 7,953,732 B2 | 5/2011 | Frank et al. | |
| 2005/0278309 A1 * | 12/2005 | Evans et al. | 707/3 |
| 2006/0036588 A1 * | 2/2006 | Frank et al. | 707/3 |
| 2007/0005590 A1 * | 1/2007 | Thrasher | 707/5 |

(Continued)

FOREIGN PATENT DOCUMENTS

| | | |
|---|---|---|
| CN | 1822001 | 8/2006 |
| CN | 101089850 | 12/2007 |

(Continued)

OTHER PUBLICATIONS

Ogawa et al. "An efficient document retrieval method using n-gram indexing." Systems and Computers in Japan 33.2 (2002): 54-63.
Yasushi Ogawa et al: "An Efficient Document Retrieval Method Using N-Gram Indexing". Systems & Computers in Japan, Wiley, Hoboken, NJ, US, vol. 33, No. 2. Feb. 1, 2002. pp. 54-63, XP001124027, ISSN: 0882-1666 p. 54, col. 1, line 1—p. 58, col. 1, line 5.

(Continued)

*Primary Examiner* — Baoquoc To
(74) *Attorney, Agent, or Firm* — Van Pelt, Yi & James LLP

(57) ABSTRACT

Finding indexed documents is described herein, including: extracting a character string from the search query and segmenting the character string into a plurality of search terms, wherein each search term comprises one or more search words; retrieving indexed document sets corresponding to search words included in the plurality of search terms; processing the retrieved indexed document sets associated with a first search term of the plurality of search terms based at least in part on a selection operation, wherein processing results of the retrieved indexed document sets associated with the first search term comprise search results for the first search term; performing set intersection operations on search results corresponding to the plurality of search terms to generate a results document set; and determining and returning a first subset of indexed documents of the results document set that each includes each of the plurality of search terms.

18 Claims, 17 Drawing Sheets

(56) References Cited

U.S. PATENT DOCUMENTS

| | | | | |
|---|---|---|---|---|
| 2009/0287676 | A1* | 11/2009 | Dasdan | 707/5 |
| 2010/0205190 | A1* | 8/2010 | Morris et al. | 707/758 |
| 2010/0223671 | A1* | 9/2010 | Tsuda | 726/26 |
| 2010/0299201 | A1* | 11/2010 | Thrasher | 705/14.49 |
| 2012/0278341 | A1* | 11/2012 | ogilvy et al. | 707/749 |

FOREIGN PATENT DOCUMENTS

| | | |
|---|---|---|
| CN | 101452459 | 6/2009 |
| CN | 102054007 | 5/2011 |
| JP | H0830639 | 2/1996 |
| JP | H08329112 | 12/1996 |

OTHER PUBLICATIONS

Ogawa Yasushi et al: "A new character-based indexing method using frequency data for Japanese documents", Proceedings of the 18th Annual International ACM SIGIR Conference on Research and Development in Information Retrieval, SIGIR '95, Jan. 1, 1995, pp. 121-129, XP055034594, New York, New York, USA DOI: 10.1145/215206.215347 ISBN: 978-0-89-791714-8 section 3.1.

Zobel J et al: "Inverted Files versus Signature Files for Text Indexing", ACM Transactions on Database Systems, ACM, New York, NY, US, vol. 23, No. 4, Dec. 1, 1998, pp. 453-490, XP002398564, ISSN: 0362-5915, DOI: 10.1145/296854.277632 sections 2.1 and 3.1.

* cited by examiner

| Index character(s) | Number of Index Documents | Address(es) of Index Documents |
|---|---|---|
| 浙 ("zhe") | 10 | A1, A2, A3, A4, A7, A8, A10, A12, A17, A20 |
| 江 ("jiang") | 12 | A1, A3, A5, A6, A11, A13, A14, A15, A17, A18, A21, A22 |
| 杭 ("hang") | 8 | A1, A2, A3, A5, A7, A10, A18, A23 |
| 州 ("zhou") | 10 | A1, A3, A4, A6, A8, A9, A11, A13, A15, A16 |
| 檸 ("ning") | 6 | A1, A3, A4, A5, A7, A9 |
| 檬 ("meng") | 5 | A1, A2, A3, A5, A18 |
| 茶 ("cha") | 9 | A1, A3, A7, A8, A10, A11, A12, A13, A17 |

FIG. 1

| First search term | Second search term | Frequency of being used together |
|---|---|---|
| 专利 | 审查 | 20 |
| ...... | ...... | ...... |
| *专利* | *知识* | *80* |
| ...... | ...... | ...... |
| 专利 | 教程 | 15 |
| 知识 | 推广 | 56 |
| 知识 | 爆炸 | 78 |
| 知识 | 经济 | 94 |
| ...... | ...... | ...... |
| *普及* | *程度* | *60* |
| ...... | ...... | ...... |
| 普及 | 教育 | 75 |

FIG. 12

//FINDING INDEXED DOCUMENTS

CROSS REFERENCE TO OTHER APPLICATIONS

This application claims priority to People's Republic of China Patent Application No. 201110147520.1 entitled A CHARACTER INDEX SYSTEM-BASED SEARCH METHOD AND DEVICE filed Jun. 2, 2011 which is incorporated herein by reference for all purposes.

FIELD OF THE INVENTION

The present invention relates to search engine technology. In particular, it relates to a technique of finding indexed documents.

BACKGROUND OF THE INVENTION

Information quantities on the Internet have increased vastly as the Internet has become more prevalent. The emergence of search engine technology has enabled people to conduct fast and convenient searches among these vast quantities of information to find the various kinds of information they need.

Using character index systems to search for information has already gained broad application. Character index systems include large numbers of preset index tables. FIG. 1 shows an example of such a preset index table. In the example, index table 100 includes three main columns of data: the left column includes indexed character(s) (e.g., a character may be indexed by itself or with one or more other characters; for example, each indexed single Chinese character or character combination may comprise a phrase or a saying), the middle column includes the number of documents that include the corresponding indexed character/combination of characters; the right column includes the address associated with each of the corresponding documents that include the corresponding indexed character/combination of characters (e.g., each of "A1, A2 . . . " represents an address in a database, for example, where an indexed document may be found). While Chinese characters are indexed in the example of index table 100, English words and morphemes of any other language may comprise the subject of indexing. For example, an indexed document is a document that has been indexed such that a reference to and/or a portion of the document, such as an address of the location at which the document is stored, may be stored to quickly retrieve/identify the document. For example, a webpage that has been processed by a web crawler may be an indexed document. In response to a search query, an index table such as index table 100 may be queried. For example, first, one or more indexed single characters and/or combinations of characters may be extracted from the search query. Then index tables such as index table 100 may be queried for indexed documents that include the indexed characters extracted from the search query. The indexed documents may be returned to the querying user.

FIG. 2 is a diagram showing an example of conducting a search using an index table. Index table 100 may be used in this example. The example process includes the following steps: 1) Receiving a search query from a user and segmenting the search query into character combinations (e.g., phrases that include one or more characters), 2) Separate the character combinations into single index characters and query index tables (e.g., index table 100) for indexed documents that include the single index characters (e.g., for example, referring to FIG. 1, the indexed document set for the single character "浙" ("Zhe") includes 10 documents that each include the character "浙"," 3) Perform set intersection operations on the indexed document sets returned for the single index characters belonging to the same character combination such that the resulting indexed document set for that character combination includes documents that each includes all the single characters belonging to that character combination, and 4) Perform set intersection operations on the indexed document sets determined for each character combination such that the final search results indexed document set includes documents that each include all the character combinations of the original search query. Typically, there is a large volume of indexed documents for each single index character so repeatedly performing set intersection operations on all of the retrieved indexed document sets may be very inefficient because there are usually several single index characters in each character combination, and also several character combinations in each search query.

BRIEF DESCRIPTION OF THE DRAWINGS

Various embodiments of the invention are disclosed in the following detailed description and the accompanying drawings.

FIG. 1 shows an example of a preset index table.

FIG. 12 is an example of a search history table to be used to determine whether search terms should be merged together.

DETAILED DESCRIPTION

Figure 2:
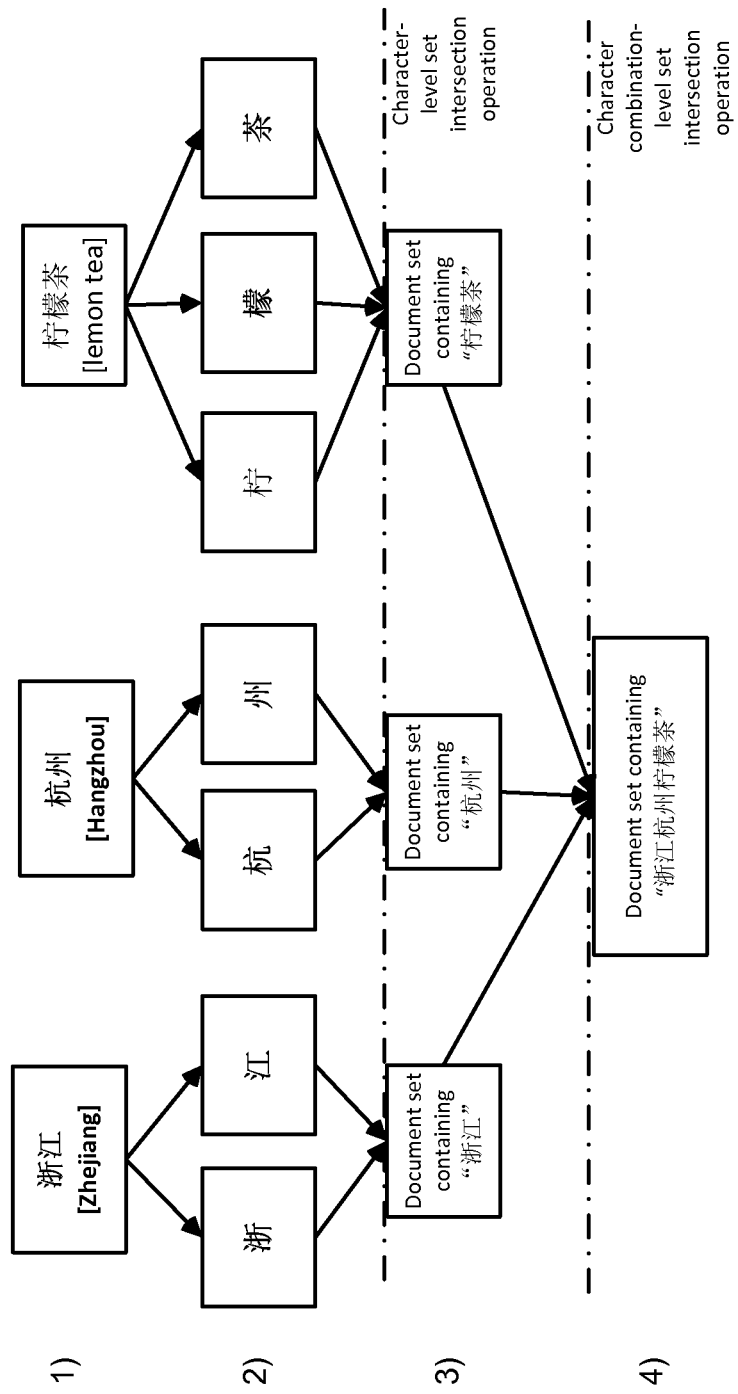
FIG. 2 is a diagram showing an example of conducting a search using an index table.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Efficiently finding indexed documents is described herein. In various embodiments, a search query is segmented into search terms. For example, a search term may comprise one or more search words. A search word is not necessarily specific to any one language but may refer to a morpheme of any language. For example, a search word in a language such as Chinese may refer to one character and a search word in a language such as English may refer to a series of characters. In some embodiments, a corresponding indexed document set is found for each search word of each search term of the search query. In some embodiments, the indexed document sets found for the search word(s) belonging to a particular search term may be referred to as the indexed document sets retrieved for that particular search term. In some embodiments, one or more selection operations are performed for the corresponding indexed document sets found for each search term. For example, the indexed document sets retrieved for each particular search term are processed and where processing includes at least a selection operation that may, for example, select a subset from all of the indexed document sets retrieved for the search term to serve as the search results for that search term or select a subset from the results of set intersection operations having been performed on subgroups of indexed document sets retrieved for the search term to serve as the search results for that search term. In some embodiments, the selection operation is configured by a system administrator. Regardless of the type of selection operation that is used, set intersection operations will be performed for fewer than all sets of indexed documents that are retrieved for a search term. In some embodiments, set intersection operations are performed on the search results corresponding to all the search terms of the search query to obtain the indexed documents that include all of the search terms of the search query and which are to be returned to the querying user.

The use of the selection operations may reduce the number of set intersection operations, which are computationally costly, that are to be performed. Furthermore, the use of the selection operations may also minimize the number of indexed documents in sets on which set intersection operations are performed, which increases efficiency because the computational cost of a set intersection operation increases with the number of indexed documents on which the operation is to be performed. Thus, by reducing the number of set intersection operations and/or minimizing the number of indexed documents on which set intersections are to be performed, the efficiency of finding indexed documents that match the search query may be improved.

Figure 3:
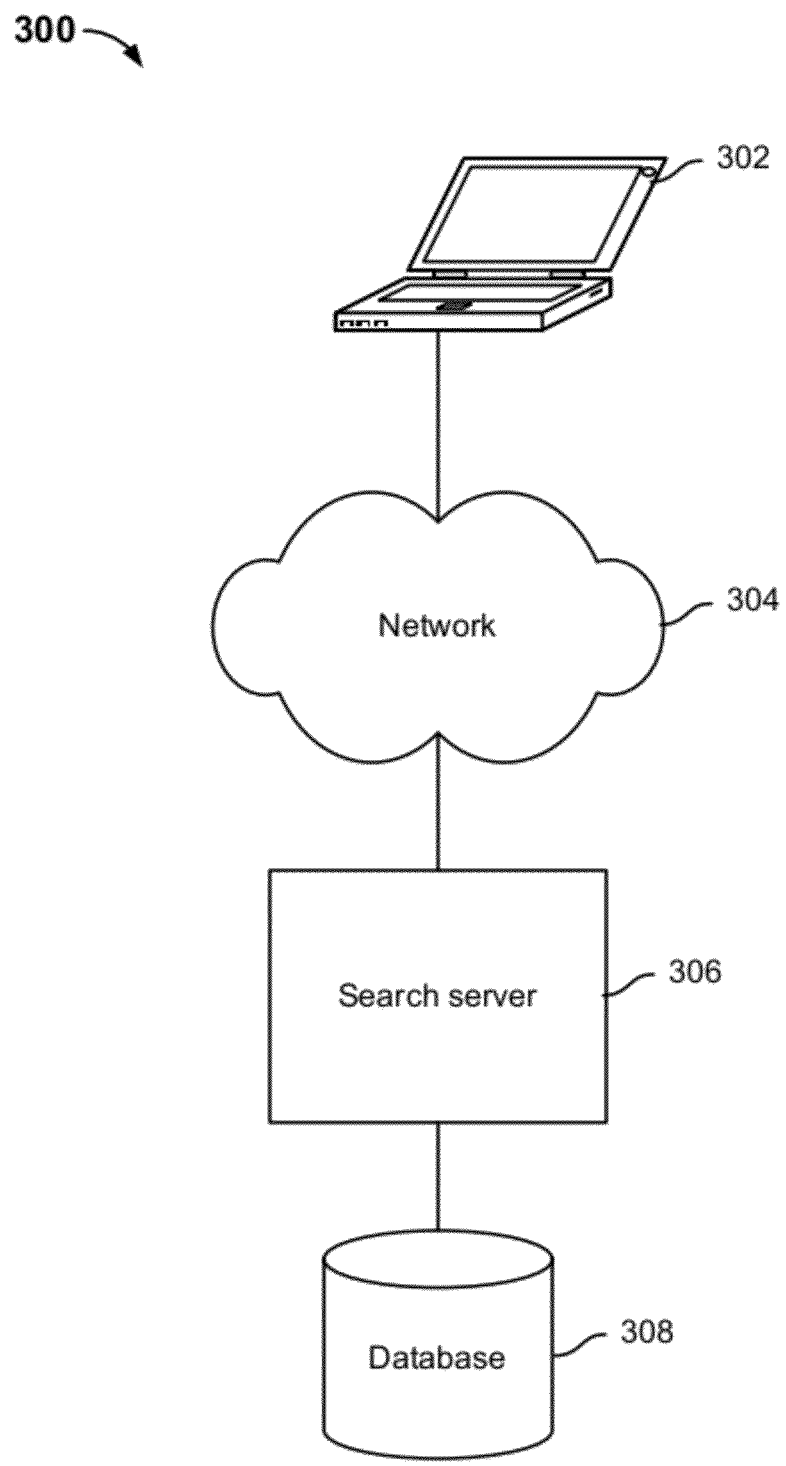
FIG. 3 is a diagram showing an embodiment of a system for finding matching indexed documents.

FIG. 3 is a diagram showing an embodiment of a system for finding matching indexed documents. System 300 includes client 302, network 304, search server 306, and database 308. Network 304 may include one or more high speed data networks and/or telecommunications networks.

Client 302 is configured to receive search queries and to send them to search server 306. While client 302 is shown to be a laptop computer, other examples of client 302 include a desktop computer, a mobile device, a smartphone, a tablet device and/or any type of computing device. A user may use a web browser application at client 302 to input a search query at a search engine and/or any other kind of search tool to receive documents (e.g., webpages, files, database entries) that match the search query. In some embodiments, an indexed document matches a search query if the document includes all the words included in the search query.

Search server 306 is configured to perform searches using search queries received from client 302 and to return matching indexed documents to client 302. In some embodiments, search server 306 comprises a web server that hosts an online search engine. In some embodiments, search server 306 is configured to segment a received search query into one or more search terms, where each search term comprises at least one search word. Search server 306 is configured to find one or more indexed documents that correspond to each search word. For example, indexed documents may be stored at search server 306 and/or elsewhere, such as database 308. For example, search server 306 may find indexed documents that correspond to a search word by querying one or more preset index tables (such as table 100) that may be stored in database 308. The returned indexed documents for search words belonging to the same search term are then processed, where processing includes selecting (e.g., using a selection operation) a subset of the indexed document sets retrieved for a search term and/or performing processing (e.g., set intersection operations) on a selected subset of indexed documents. By processing a subset of the indexed document sets retrieved for a search term as opposed to performing set intersections on all indexed documents retrieved for the search term, efficiency in the search is increased. The processing results for each search term are referred to as the search results for that search term. Search server 306 then performs set intersection operations on the search results produced for the various search terms of the search query to generate a results document set. Then, to verify that the indexed documents of the results document set includes all the search terms, each such indexed document is scanned by search server 306 to determine whether all the search terms are present. Search server 306 returns only those indexed documents of the results document set that include all the search terms of the search query to client 302.

Figure 4:
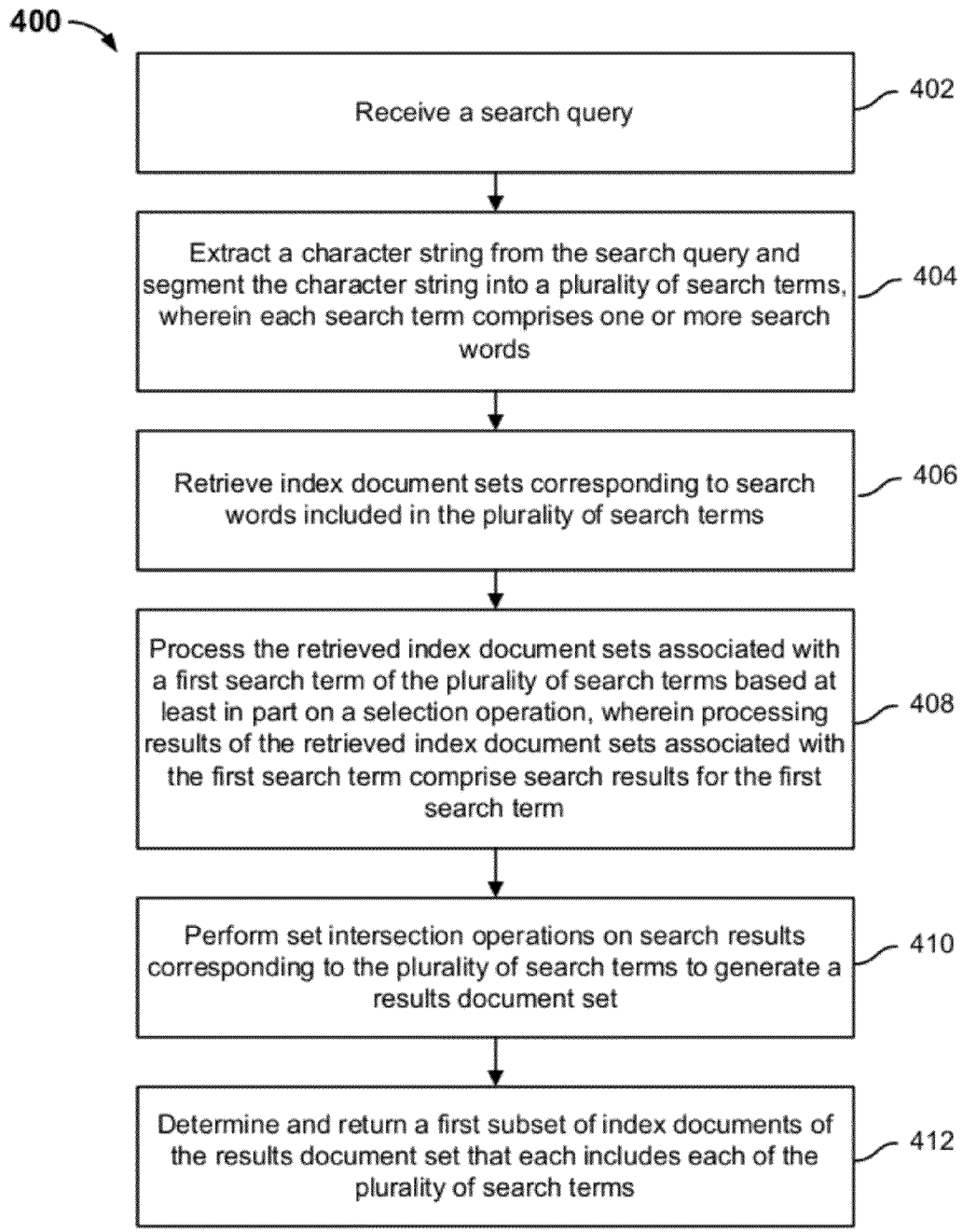
FIG. 4 is a diagram showing an embodiment of a process for finding matching indexed documents.

FIG. 4 is a diagram showing an embodiment of a process for finding matching indexed documents. In some embodiments, process 400 may be implemented at system 300.

Process 400 is used to efficiently return indexed documents that match a search query submitted by a user. For example, to match the search query, an indexed document must include at least one instance of each word included in the query. Rather than processing (e.g., using set intersection operations on) all of the indexed document sets retrieved for a search term, less than all of the indexed document sets are processed and/or selected by at least one configurable selection operation to serve as the search results for the search term. By using a selection operation to reduce the number of indexed documents to process per search term and/or the number of set intersection operations to perform per search term, the processing (e.g., performing set intersection operation(s)) complexity, time, and volume are all greatly reduced, which also decreases the time required by a search engine to find matching indexed documents to be returned to the user.

Regarding set intersection operations, for example, performing the set intersection operation on the sets A and B (e.g., the intersection of sets A and B is denoted A∩B) determines a set of all objects that are members of both A and B. In the context of applying the intersection operation to sets of indexed documents, in some embodiments, performing the intersection operation on a first set of indexed documents corresponding to index word A (e.g., each indexed document of the first set includes at least one instance of the word A) and a second set of indexed documents corresponding to index word B (e.g., each indexed document of the second set includes at least one instance of the word B) would produce a third set of indexed documents comprising a subset of the first and second sets of index sets that corresponds to both words A and B (e.g., each indexed document of the third set includes at least one instance of the word A and at least one instance of B). In another example, performing the set intersection operation on the sets A, B, and C (e.g., the intersection of sets A, B, and C is denoted A∩(B∩C), for example) determines a set of all objects that are members of A, B, and C.

The following is one example of performing a set interaction operation on indexed document sets that respectively correspond to words A, B, and C. In this example, each indexed document is identified by a number (e.g., 1). Identifiers of the indexed documents that correspond to a particular word are stored, in this example, in a data structure such as a linked list, where each node stores the identifier associated with one indexed document and the nodes of the linked list are sorted based on their respective indexed document identifiers. For example, the linked list associated with word A includes the following sorted nodes: 1, 2, 3, 4, 5, 8, and 10 (meaning that the word A is found in each of indexed documents 1, 2, 3, 4, 5, 8, and 10); the linked list associated with word B includes the following sorted nodes: 2, 4, 8, and 9; and the linked list associated with word C includes the following sorted nodes: 3, 4, 8, and 10. The linked lists are to be compared to determine values that are common to all three linked lists. First, values of the first node of all three linked lists (1 from the list of word A, 2 from the list of word B, and 3 from the list of word C) are compared. Because not all three values are the same, at least some of the linked lists are to be traversed to a subsequent node. Since the largest value of 3 corresponds to word C, the linked lists corresponding to words A and B, respectively, are each traversed until a value is reached that is at least 3. The linked list of word A is traversed until the third node that includes a value of 3 and the linked list of word B is traversed until the second node that includes a value of 4. Once again, the values of the current nodes of all three linked lists are compared again. Because not all three values are the same, further traversal of linked lists is needed. Because the largest value of 4 corresponded to word B, the linked lists corresponding to words A and C, respectively, are each traversed until a value is reached that is at least 4. The linked list of word A is traversed until the fourth node that includes a value of 4 and the linked list of word C is traversed until the second node that includes a value of 4. The values of the current nodes of all three linked lists are then compared again. All three values are the same so that the indexed document associated with the identifier value of 4 is determined to include all of words A, B, and C and is to be included in the results set of this set intersection operation. The next node of each linked list is compared to each other and the process continues to find values that are common to all three linked lists until any one of the linked lists is traversed to its last node.

At 402, a search query is received. In various embodiments, the search query comprises a series of natural language morphemes and logic terms that describe the logical relations between these morphemes. A morpheme is the smallest semantically meaningful unit in a language. For example, a morpheme may comprise a Chinese word. Logic terms may indicate the type of logical operation that is to be performed on the indexed documents matching the morphemes of the search query. For example, logic terms may include Boolean operators such as "AND." In some embodiments, in the absence of any logical term between two morphemes in a search query, the default logical term to be used is "AND."

At 404, a character string is extracted from the search query and the character string is segmented into a plurality of search terms, wherein each search term comprises one or more search words.

In some embodiments, a character string is extracted from the search query by extracting only the characters and not other symbols from the search query. The character string is then segmented into search terms. Each search term may comprise a set of one or more search words. Each search term may comprise a single word, a phrase, a meaningful combination of multiple words, an idiom, and a short sentence, for example. The rules for segmenting the character string may differ in different search systems and language environments. In some embodiments, the character string is segmented in accordance with the grammatical system of the language used in the search query. In the examples described herein, where the search query is in Chinese, each search word is also sometimes referred to as a search character.

For example, consider the following search query constructed in Chinese: "浙江 杭州柠檬茶" ("Zhejiang Hangzhou lemon tea"). The query is segmented into three search terms: "浙江" ("Zhejiang" is a province in China), "杭州" ("Hangzhou" is a city in Zhejian province), "柠檬茶" ("ningmengcha" meaning "lemon tea"). The search terms would not be segmented into "浙江杭" ("Zhejiang Hang"), "州柠檬" ("state lemon")," and "茶" ("tea") because such a division would not conform to the practices of the natural language of Chinese. In another example, consider the following search query constructed in Chinese: "利比亚岌岌可危" (meaning "Libya is in a precarious situation"). The search query is segmented into two search terms: the country name "利比亚" ("Libya") and the saying "岌岌可危" ("is in a precarious situation"). In a further example, consider the following search query constructed in Chinese: "他山之石可以攻玉的出处" (the origin of the saying is "a stone from another mountain can be used to polish jade"). The search query may be segmented into three search terms: the phrase "他山之石可以攻玉" ("a stone from another mountain can be used to polish jade"), the single character "的" ("of"), and the character combination "出处" ("the origin").

At 406, indexed document sets corresponding to search words included in the plurality of search terms are retrieved.

Each search term includes one or more search words. For example, the search term "浙江" ("Zhejiang") includes the two search characters "浙" ("Zhe") and "江" ("jiang"). In some embodiments, to retrieve indexed document sets for each of the search words included in each search term of the search query, preset index tables may be queried. As shown above, preset index tables may include the indexed documents corresponding to each index character/word and the respective addresses of these corresponding indexed documents. For example, one or more preset index tables may be queried for the search character "浙" ("Zhe") and a first set of indexed documents (e.g., and their respective addresses) that include "浙" ("Zhe") will be returned. Also, one or more preset index tables may be queried for the search character "江" ("jiang") and a second set of indexed documents (e.g., and their respective addresses) that include "江" ("jiang") will be returned.

At 408, the retrieved indexed document sets associated with a first search term of the plurality of search terms are processed based at least in part on a selection operation, wherein processing results of the retrieved indexed document sets associated with the first search term comprise search results for the first search term.

Processing of the indexed document sets retrieved for each search term and using at least one configurable selection operation to minimize the number of indexed documents to process (e.g., perform set intersection operations on) and/or reduce the number of process (e.g., perform set intersection operations on) operations is to be performed. In various embodiments, by processing the indexed document sets retrieved for a search term and using at least one configurable selection operation, set intersection operations are to be performed on fewer than all indexed document sets retrieved for that search term.

In some embodiments, to reduce the volume of indexed documents to process, a selection operation indicates to first choose a subset of all the indexed document sets retrieved for a search term to be processed for that search term, if processing is needed. Then, after the subset of indexed document sets are processed, the processing results are designated to serve as the search results of that search term.

In some embodiments, a selection operation indicates that all the indexed document sets retrieved for a search term are divided into groups and each group is processed and then a subset of the processing results of the groups is to be designated to serve as the search results of that search term.

In some embodiments, a selection operation indicates that all the indexed document sets retrieved for a search term are divided into groups and a subset of indexed document set(s) is selected from each group. The indexed document(s) selected from the groups are then processed and the processing results are to be designated to serve as the search results of that search term.

Various examples of processing the retrieved indexed document sets based on a selection operation are described in at least FIGS. 5, 6, and 7, below.

At 410, set intersection operations are performed on the search results corresponding to the plurality of search terms to generate a results document set.

In some embodiments, set intersection operations are performed on the search results of each search term of the search query to obtain a results document set.

At 412, a first subset of indexed documents of the results document set that each includes each of the plurality of search terms is determined and returned.

In some embodiments, it is determined which of the documents in the results documents includes every one of the search terms of the search query. Because the indexed documents in the search results of a search term may not include every search word of that search term because of the selection operation, some indexed documents in the results document set may also include fewer than all the search words of the search query. As a result, each of the indexed documents of the results document set is verified for whether they do in fact include all the search terms of the search query. If an indexed document in the results document set includes every one of the search terms of the search query, then it is determined that the document will be included in the first subset of indexed documents of the results document set to be returned to the user in response to the search query. But if an indexed document does not include at least one search term, then the indexed document is excluded from the first subset. For example, the first subset of the results document set that is to be returned to the user includes at least one instance of every search term (and thus, every search word) of the search query. Those documents of the results document set that exclude at least one search term of the search query are not included in the first subset of indexed documents.

For example, if an indexed document in the results document set determined for the search query of "浙江杭州柠檬茶" includes "浙" ("Zhe") and "杭" ("Hang") but do not include "浙江" ("Zhejiang") and "杭州" ("Hangzhou"), then this indexed document will be excluded from the first subset of indexed documents to be returned to the user. If the indexed document included both "浙江" ("Zhejiang") and "杭州" ("Hangzhou") as well as "柠檬茶" ("ningmengcha"), then the indexed document will be included in the first subset and returned to be user. After the documents are returned to the user, the indexed documents may be saved by the user on to various media (e.g., network hard drives, mail boxes, and other external storage equipment).

Figure 5:
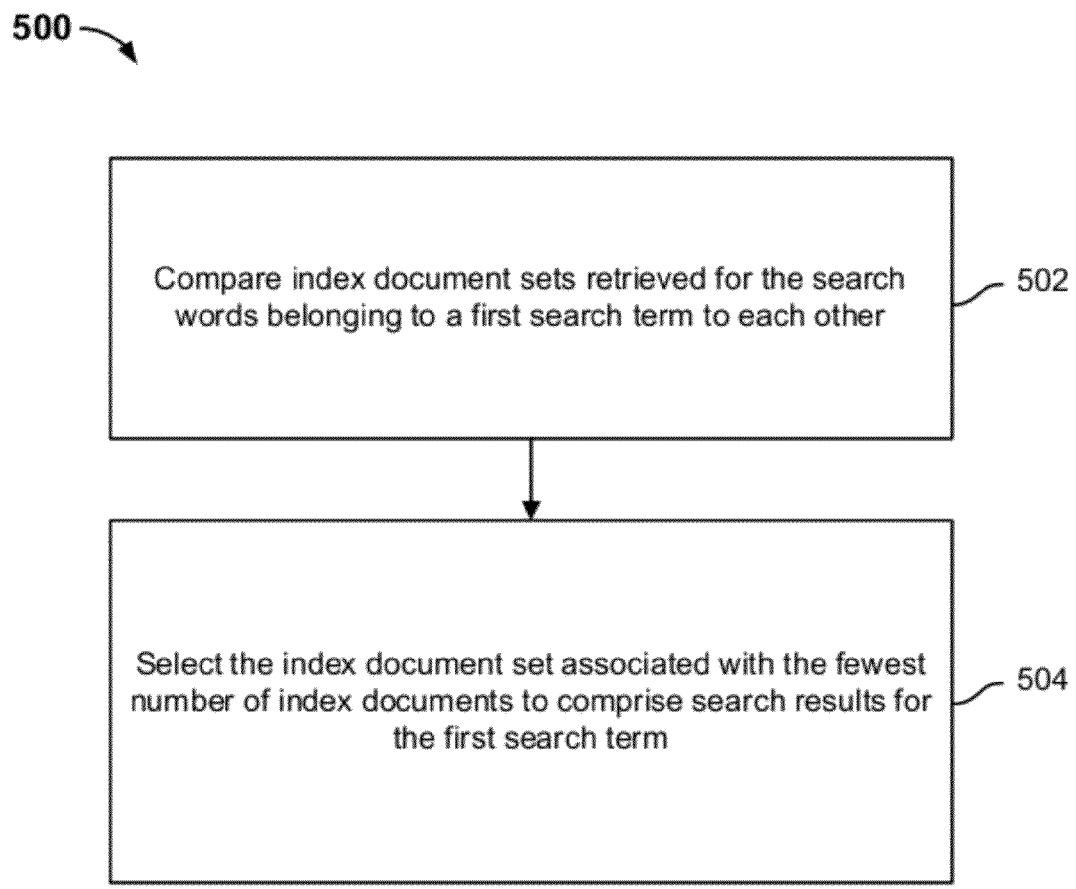
FIG. 5 is a flow diagram showing an embodiment of performing a selection operation on indexed document sets associated with a search term.

FIG. 5 is a flow diagram showing an embodiment of performing a selection operation on indexed document sets associated with a search term. In some embodiments, process 500 may be implemented at system 300. In some embodiments, process 500 may be used to implement 408 of process 400.

As mentioned above, processing of indexed document sets based on a selection operation in 408 of process 400 may be implemented in various ways. In some embodiments, the selection operation may be the selection of one indexed document set retrieved for search words belonging to a particular search term that are the search results of that search term. Process 500 shows a specific example of such a selection operation where the selection operation selects the indexed document set associated with a search word belonging to a first search term with the fewest number of indexed documents to comprise the search results for the first search term.

At 502, the indexed document sets retrieved for the search words belonging to a first search term are compared to each other. For example, assume that the first search term was "浙江" ("Zhejiang"), which includes search characters "浙" ("Zhe") and "江" ("jiang"). In this example, the indexed document set retrieved for "浙" ("Zhe") may include 34 documents and the indexed document set retrieved for "江" ("jiang") may include 16 indexed documents.

At 504, the indexed document set associated with the fewest number of indexed documents is selected to comprise the search results for the first search term. Returning to the example above, because the indexed document set retrieved for "江" ("jiang") includes fewer indexed documents (16) than the indexed document set retrieved for "浙" ("Zhe") (34), then the indexed document sets retrieved for "江" ("jiang") will be considered as the search results for search term "浙江" ("Zhejiang") while the indexed document set retrieved for "浙" ("Zhe") will be unused/ignored.

The following is another, different example that illustrates finding indexed documents using process 400 and in particular, using process 500 to implement 408: Assume that a user conducts a search with the query "浙江杭州" ("Zhejiang Hangzhou"). The number of indexed documents in the indexed document set that is retrieved for "浙" ("Zhe") (e.g., as looked up in preset index tables) is N1, the number of indexed documents in the indexed document set that is retrieved for "江" ("jiang") is M1, the number of indexed documents in the indexed document set that is retrieved for "杭" ("Hang") is N2, and the number of indexed documents in the indexed document set that is retrieved for "州" ("zhou") is M2. After the search query "浙江 杭州" ("Zhejiang Hangzhou") is segmented into the two search terms "浙江" ("Zhejiang") and "杭州" ("Hangzhou"), N1 "浙" ("Zhe") indexed documents is selected to serve as the search results for the search term "浙江" ("Zhejiang") and N2 "杭" ("Hang") indexed documents is selected as the search result for the search term "杭州" ("Hangzhou"). Then set intersection operations are performed on these two search results for the search terms "浙江" ("Zhejiang") and "杭州" ("Hangzhou") to obtain the set of result documents where each document of the results document set includes at least one instance of "浙" ("Zhe") and "杭" ("Hang"). Based on conventional techniques, at least N1×M1+N2×2 set intersection operations would have been needed to be performed but in a process such as process 500, only N1×N2 set intersection operations are needed to be performed. Thus, the number of operations to be performed has been greatly reduced. In this example, especially if M1>N1 and M2>N2, the computation time is even further reduced because the number of indexed documents on which to perform set intersection operations is reduced.

Figure 6:
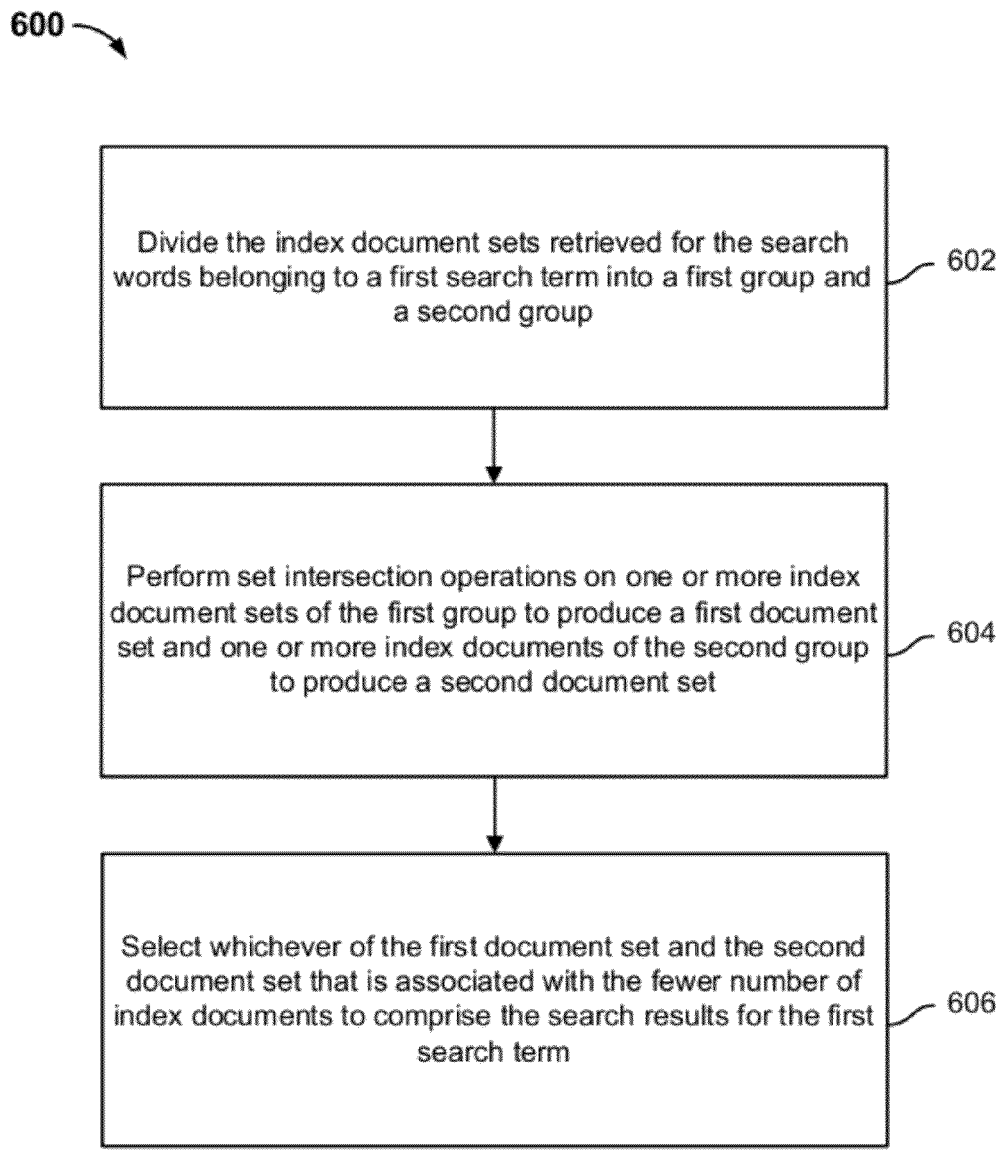
FIG. 6 is a flow diagram showing an embodiment of performing a selection operation on indexed document sets associated with a search term.

FIG. 6 is a flow diagram showing an embodiment of performing a selection operation on indexed document sets associated with a search term. In some embodiments, process 600 may be implemented at system 300. In some embodiments, process 600 may be used to implement 408 of process 400.

As mentioned above, the processing of indexed document sets based on a selection operation in 408 of process 400 may be implemented in various ways. In some embodiments, the selection operation may include first dividing the sets of indexed documents for a particular search term into two groups, performing set intersection operations on each group of indexed document sets to produce a first document set and a second document, and choosing whichever of the first and second document sets includes the fewer number of indexed documents as the search results for that search term. In some embodiments, the sets of indexed documents retrieved for a particular search term may be divided into more than two groups and processed similarly.

At 602, the indexed document sets retrieved for the search words belonging to a first search term are divided into a first group and a second group. In some embodiments, the indexed document sets retrieved for the search words of the first search term may be divided on any appropriate basis into two groups. For example, if there is an even number of indexed document sets, then the indexed document sets may be divided into two groups of evenly numbered sets. Or if there is an odd number of indexed document sets, then the indexed document sets may be divided into two groups, where one group has one more set than the other group.

At 604, set intersection operations are performed on one or more indexed document sets of the first group to produce a first document set and on one or more indexed document sets of the second group to produce a second document set. Set intersection operations are performed on the indexed document sets of the first group to produce a first document set in which each indexed document includes at least one instance of each search word included in each indexed document in the first group and also performed on the indexed document sets of the second group to produce a second document set in which each indexed document includes at least one instance of each search word included in each indexed document in the second group.

At 606, whichever of the first document set and the second document set that is associated with a fewer number of indexed documents is selected to comprise the search results for the first search term.

Rather than performing set intersections on all indexed document sets that are retrieved for a search term at once, in process 600, set intersection operations are performed on only for a sub-group of the indexed document sets for the search term at a time, which increases efficiency because the fewer indexed documents that set intersection operations need to perform on at a time, the short and more computationally efficient the operations become. The following example is an example that illustrates the efficiency of finding indexed documents using process 400 and in particular, using process 600 to implement 408: Assume that a user conducts a search with the query "专利申请文件" ("zhuan li shen qing wen jian," which means a patent application document). Assume that the individual search characters ("专" ("zhuan"), "利" ("li"), "申" ("shen"), "请" ("qing"), "文" ("wen"), and "件" ("jian")) are associated with the following numbers of indexed documents, respectively: 1, 3, 5, 2, 4 and 6. If set intersection operations were to be performed on all of the indexed document sets retrieved for the search term, then the number of set intersection operations would be: 1×3×5×2×4×6=720. However, in process 600, the indexed document sets of the first three characters "专利申" ("zhuan li shen") may be divided into the first group, and the indexed document sets of the latter three characters "请文件" ("qing wen jian") may be divided into the second group. So the number of set intersection operations to be performed for the first group would be 1×3×5=15 and the number of set intersection operations to be performed for the second group would be 2×4×6=48. So the total number of set intersection operations to be performed for the search term is: 1×3×5+2×4×6=63. So, the number of set intersection operations has been reduced greatly by performing set intersection operations on subgroups of indexed document sets associated with a search term.

Figure 7:
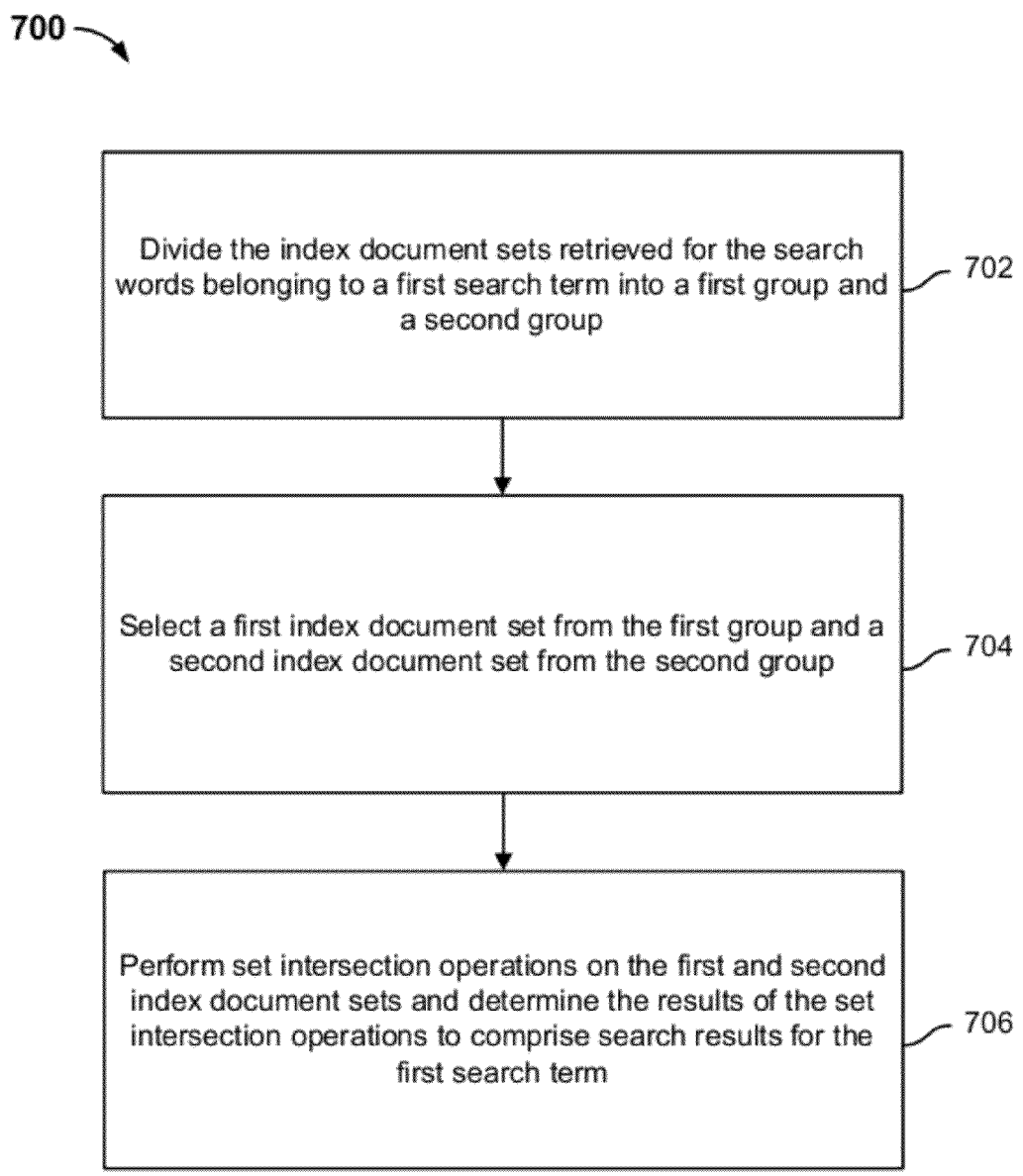
FIG. 7 is a flow diagram showing an embodiment of performing a selection operation on indexed document sets associated with a search term.

FIG. 7 is a flow diagram showing an embodiment of performing a selection operation on indexed document sets associated with a search term. In some embodiments, process 700 may be implemented at system 300. In some embodiments, process 700 may be used to implement 408 of process 700.

As mentioned above, the processing of indexed document sets based on a selection operation in 408 of process 400 may be implemented in various ways. In some embodiments, the selection operation may include first dividing the sets of indexed documents for a particular search term into two groups, choosing one indexed document set from each group, performing set intersection operations on the selected two indexed document sets, and using results from the set intersection operations to serve as the search results for that search term. In some embodiments, the sets of indexed documents for a particular search term may be divided into more than two groups and processed similarly.

At 702, the indexed document sets retrieved for the search words belonging to a first search term are divided into a first group and a second group. In some embodiments, the indexed document sets, retrieved for the search words of the first search term, may be divided in any appropriate basis into two groups.

At 704, a first indexed document set is selected from the first group and a second indexed document set is selected from the second group. One indexed document set may be selected from each of the two groups based on any appropriate basis. For example, the indexed document set associated with the fewest number of indexed documents of a group may be selected from that group.

At 706, set intersection operations are performed on the first and second indexed document sets and the results of the set intersection operations are determined to comprise the search results for the first search term. The results of the set intersection operations on the two indexed document sets selected from the first and second groups each includes at least one instance of the search word associated with the first selected indexed document set and at least one instance of the search word associated with the second selected indexed document set. The results of the set intersection operations will serve as the search results for the first search term.

The following is an example that illustrates finding indexed documents using process 400 and in particular, using process 700 to implement 408. Assume that a user conducts a search with the query "专利申请文件" ("zhuan li shen qing wen jian" meaning a patent application document). Assume that the individual search characters ("专" ("zhuan"), "利" ("li"), "申" ("shen"), "请" ("qing"), "文" ("wen"), and "件" ("jian")) are associated with the following numbers of indexed documents, respectively: 1, 3, 5, 2, 4 and 6. The indexed document sets corresponding to search characters "专," "利," and "申" ("zhuan," "li," and "shen") are part of the first group, and the indexed document sets corresponding to search characters "请," "文," and "件" ("qing," "wen," and "jian") are part of the second group. If set intersection operations were to be performed on all of the indexed document sets retrieved for the search term, then the number of set intersection operations would be: 1×3×5×2×4×6=720. However in process 700, after the number of indexed documents of the indexed document sets of each group are compared against each other, the indexed document set selected for the first group corresponds to the search character "专" ("zhuan") and includes 1 indexed document, and the indexed document set selected for the second group corresponds to "请" ("qing") and includes 2 indexed documents. Thus, the number of set intersection operations on the selected first and second document sets is: 1×2=2. Even if the indexed document sets having the most number of indexed documents (the set that corresponds to "申" ("shen") in the first group and the set that corresponds to "件" ("jian") in the second group) are selected, the total number of set intersection operations will only be 5×6=30, which is still much less than the 720 number of set intersection operations that could have otherwise been required.

Figure 8:
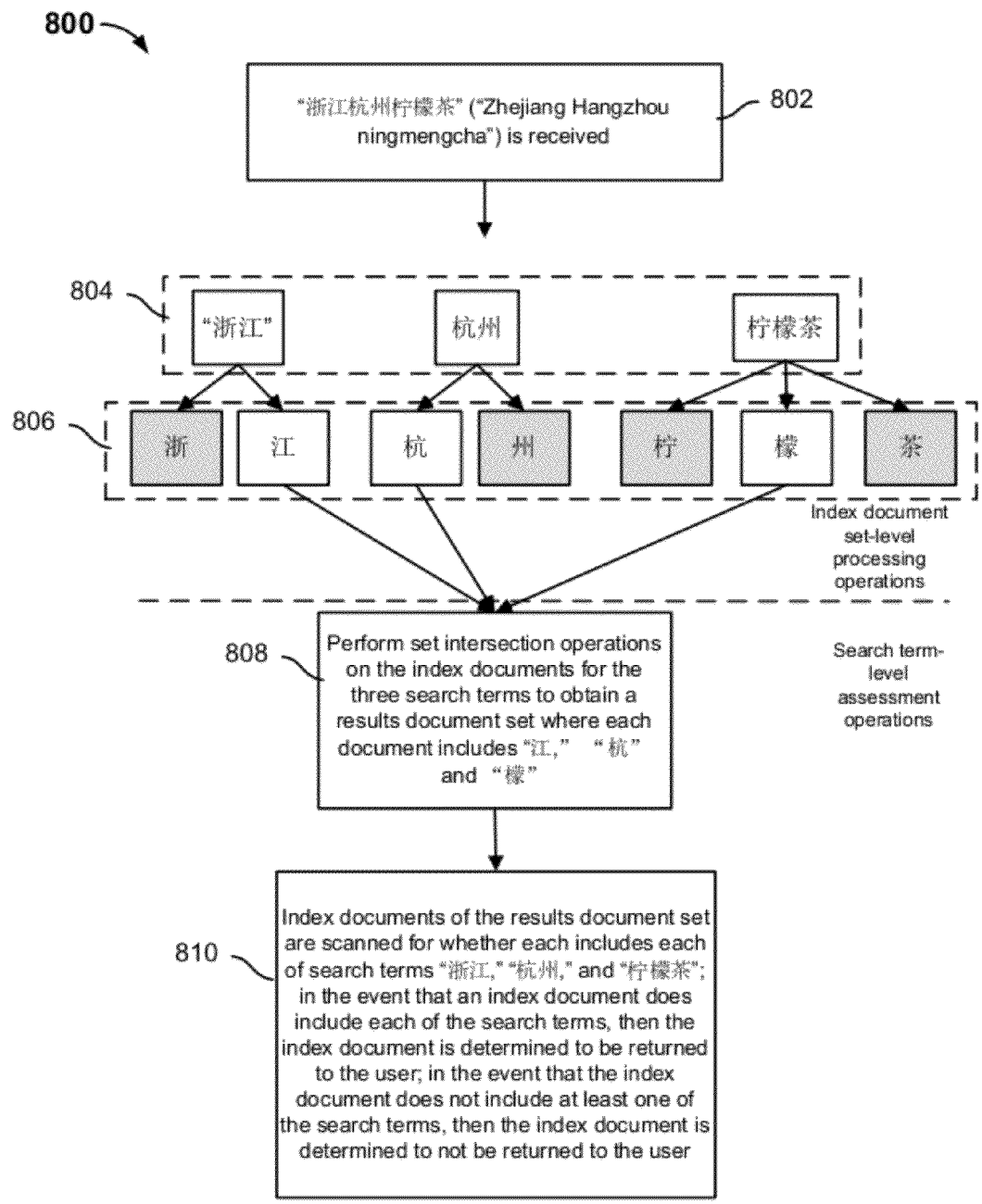
FIG. 8 is a diagram showing an example of a process for finding matching indexed documents.

FIG. 8 is a diagram showing an example of a process for finding matching indexed documents. In some embodiments, process 800 is implemented at system 300.

Process 800 shows a specific example of applying process 400. In this example, a user wishes to search for information on lemon tea in Hangzhou, Zhejiang. So, the user inputs the Chinese search query of "浙江杭州柠檬茶" ("Zhejiang Hangzhou ningmengcha," meaning "Zhejiang Hangzhou lemon tea").

At 802, search query "浙江杭州柠檬茶" ("Zhejiang Hangzhou ningmengcha") is received. For example, "浙江杭州柠檬茶" may be input in a search engine query box by the user.

At 804, the search query "浙江杭州柠檬茶" is segmented into three search terms, "浙江" ("Zhejiang"), "杭州" ("Hangzhou"), and "柠檬茶" ("ningmengcha" meaning "lemon tea") based at least in part on grammatical rules of the Chinese language.

At 806, an indexed document set corresponding to each search word of each search term is retrieved and one indexed document set from the indexed document sets retrieved for a search term is selected to comprise the search results for that search term.

First, an indexed document set is retrieved for each search word in each search term of the search query. For example, the indexed document set for a search word may be retrieved by querying one or more preset index tables. Thus, for the search term "浙江" ("Zhejiang"), an indexed document set is retrieved for "浙" ("Zhe") and another indexed document set is retrieved for "江" ("jiang"); for the search term "杭州" ("Hangzhou"), an indexed document set is retrieved for "杭" ("Hang") and another indexed document set is retrieved for "州" ("zhou"); for the search term "柠檬茶" ("ningmengcha"), a first indexed document set is retrieved for "柠" ("ning"), a second indexed document set is retrieved for "檬" ("meng"), and a third indexed document set is retrieved for "茶" ("cha"). In this example, one set of indexed document sets is arbitrarily selected for each search term.

For the search term "浙江" ("Zhejiang"), the indexed document sets retrieved for "江" ("jiang") include 12 indexed documents that are arbitrarily selected as the search result for the search term. As shown in the example, the box including "浙" ("Zhe") is shaded in to represent that the indexed document set retrieved for "浙" ("Zhe") will not be further used. The indexed documents of the search results for the search term "浙江" ("Zhejiang") each includes "江" ("jiang") and may be identified by their respective addresses at A1, A3, A5, A6, A11, A13, A14, A15, A17, A18, A21 and A22. For the search term "杭州" ("Hangzhou"), the indexed document sets retrieved for "杭" ("Hang") include 10 indexed documents that are arbitrarily selected as the search result for the search term. As shown in the example, the box including "州" ("zhou") is shaded in to represent that the indexed document set retrieved for "州" ("zhou") will not be further used. The indexed documents of the search results for the search term "杭州" ("Hangzhou") each includes "杭" ("Hang") and may be identified by their respective addresses at A1, A2, A3, A5, A7, A10, A18, and A23. For the search term "柠檬茶" ("ningmengcha"), the indexed document sets retrieved for "檬" ("meng") include 5 indexed documents that are arbitrarily selected as the search result for the search term. As shown in the example, the boxes including "柠" ("ning") and "茶" ("cha") are shaded in to represent that the indexed document sets retrieved for "柠" ("ning") and "茶" ("cha") will not be further used. The indexed documents of the search results for the search term "柠檬茶" ("ningmengcha") each includes "檬" ("meng") and may be identified by their respective addresses at A1, A2, A3, A5 and A18.

At 808, set intersection operations are performed on the search results for "浙江" ("Zhejiang"), "杭州" ("Hangzhou"), and "柠檬茶" ("ningmengcha") to obtain a set of results documents, wherein each indexed document of the results document set includes at least one instance of "江" ("Jiang"), "杭" ("Hang"), and "檬" ("meng"). Returning to the previous example, the obtained results document set includes indexed document A1 and indexed document A3.

At 810, a first indexed document of the results document set is scanned to determine whether the first indexed document includes each of search terms "浙江" ("Zhejiang"), "杭州" ("Hangzhou"), and "柠檬茶" ("ningmengcha"); in the event that the first indexed document does include each of the search terms, then the first indexed document is determined to be returned to the user; in the event that the first indexed document does not include at least one of the search terms, then the first indexed document is determined to not be returned to the user. Returning to the previous example, indexed documents A1 and A3 are each checked to determine whether the indexed document includes at least one instance of "浙江" ("Zhejiang"), "杭州" ("Hangzhou"), and "柠檬茶" ("ningmengcha"). If so, then the indexed document is determined to match the search query and returned to the user. Otherwise, if the indexed document does not include at least one of "浙江" ("Zhejiang"), "杭州" ("Hangzhou"), and "柠檬茶" ("ningmengcha"), then the indexed document is not returned to the user. In this example, it is determined that both indexed documents A1 and A3 each includes all three search terms and so both indexed documents are returned to the user.

By selecting just one indexed document set to serve as the search results for each search term, set intersection operations need to be performed on fewer indexed documents and thus the search of relevant information becomes more efficient.

Figure 9:
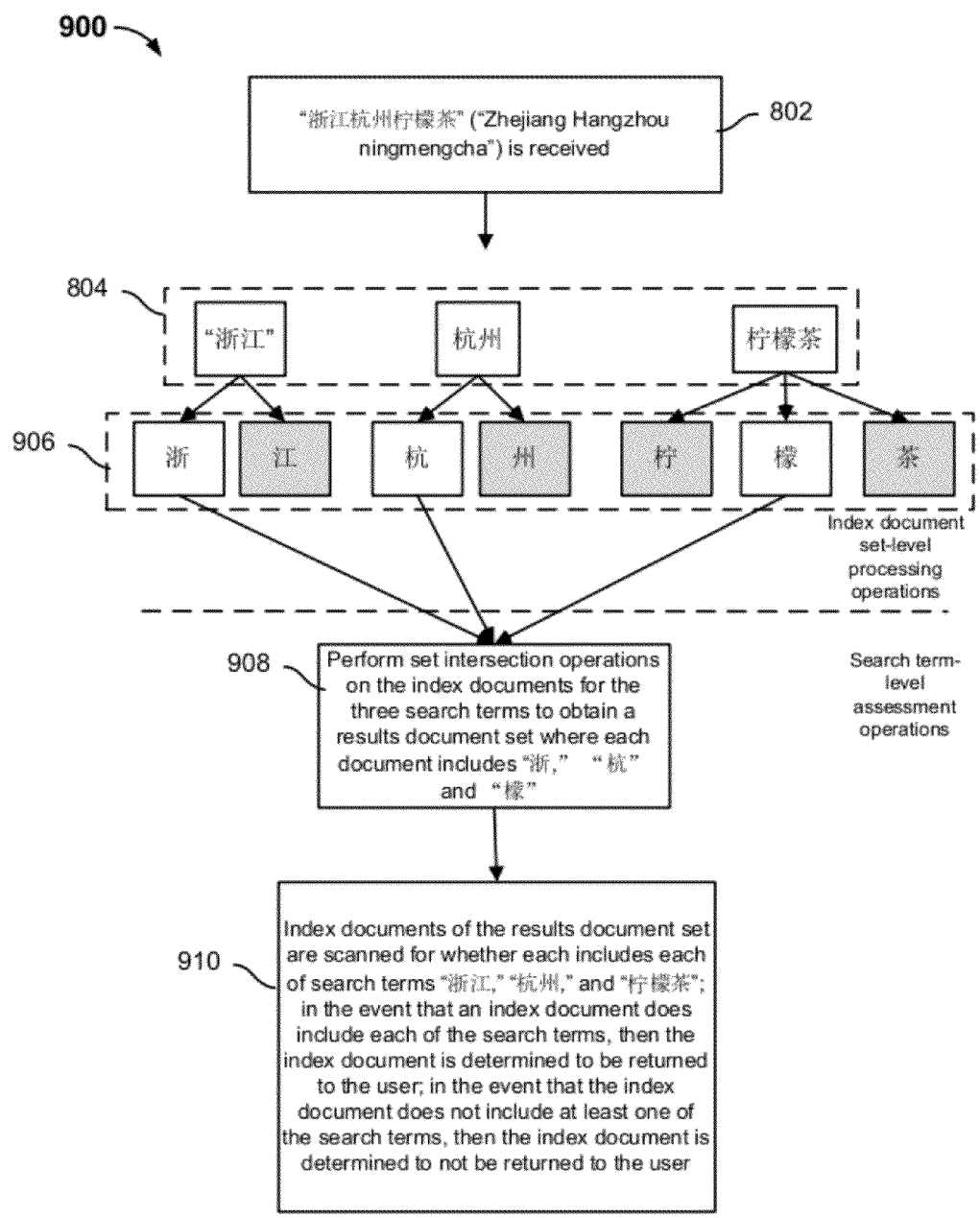
FIG. 9 is a diagram showing an example of a process for finding matching indexed documents.

FIG. 9 is a diagram showing an example of a process for finding matching indexed documents.

Whereas process 800 used the example of selecting any arbitrary one indexed document set to serve as the search result for a search term, process 900 illustrates another example of choosing the indexed document set associated with the fewest number of indexed documents as the search results for a search term. Process 900 may be implemented with 802 and 804 of process 800 and where process 900 would replace 806, 808, and 810 of process 800.

At 906, an indexed document set corresponding to each search word of each search term is retrieved and one indexed document set from the indexed document sets belonging to search words associated with a search term is selected to comprise the search results for that search term, wherein the selected indexed document set is associated with the fewest number of indexed documents associated with a search word that belongs in that search term.

First, an indexed document set is retrieved for each search word in each search term of the search query. For example, the indexed document set for a search character/word may be retrieved by querying one or more preset index tables. Thus, for the search term "浙江" ("Zhejiang"), an indexed document set that includes 10 indexed documents is retrieved for "浙" ("Zhe") and another indexed document set that includes 12 indexed documents is retrieved for "江" ("jiang"), so the indexed document set of "浙" ("Zhe") that includes fewer indexed documents is selected as the search results for the search term; for the search term "杭州" ("Hangzhou"), an indexed document set that includes 8 indexed documents is retrieved for "杭" ("Hang") and another indexed document set that includes 10 indexed documents is retrieved for "州" ("zhou"), so the indexed document set of "杭" ("Hang") that includes fewer indexed documents is selected as the search results for the search term; for the search term 柠檬茶 ("ningmengcha"), a first indexed document set that includes 6 indexed documents is retrieved for "柠" ("ning"), a second indexed document set that includes 5 indexed documents is retrieved for "檬" ("meng"), and a third indexed document set that includes 9 indexed documents is retrieved for "茶" ("cha"), so the indexed document set of "檬" ("meng") that includes the fewest indexed documents is selected as the search results for the search term.

At 908, set intersection operations are performed on the search results for "浙江" ("Zhejiang"), "杭州" ("Hangzhou"), and "柠檬茶" ("ningmengcha") to obtain a set of results documents, wherein each indexed document of the results document set includes at least one instance of "浙" ("Zhe"), "杭" ("Hang"), and "檬" ("meng"). Returning to the previous example, the obtained results document set includes indexed document A1, indexed document A2, and indexed document A3.

At 910, a first indexed document of the results document set is scanned to determine whether the first indexed document includes each of search terms "浙江" ("Zhejiang"), "杭州" ("Hangzhou"), and "柠檬茶" ("ningmengcha"); in the event that the first indexed document does include each of the search terms, then the first indexed document is determined to be returned to the user; in the event that the first indexed document does not include at least one of the search terms, then the first indexed document is determined to not be returned to the user. Returning to the previous example, indexed documents A1 and A3 are each checked to determine whether the indexed document includes at least one instance of "浙江" ("Zhejiang"), "杭州" ("Hangzhou"), and "柠檬茶" ("ningmengcha"). If so, then the indexed document is determined to match the search query and returned to the user. Otherwise, if the indexed document does not include at least one of "浙江" ("Zhejiang"), "杭州" ("Hangzhou"), and "柠檬茶" ("ningmengcha"), then the indexed document is not returned to the user. In this example, it is determined that indexed documents A1 and A3 each includes all three search terms but indexed document A2 does not include all three search terms so only indexed documents A1 and A3 would be returned to the user.

By selecting the one indexed document set associated with the fewest number of indexed documents to serve as the search results for each search term, set intersection operations need to be performed on fewer indexed documents and thus the search of relevant information becomes more efficient.

Figure 10:
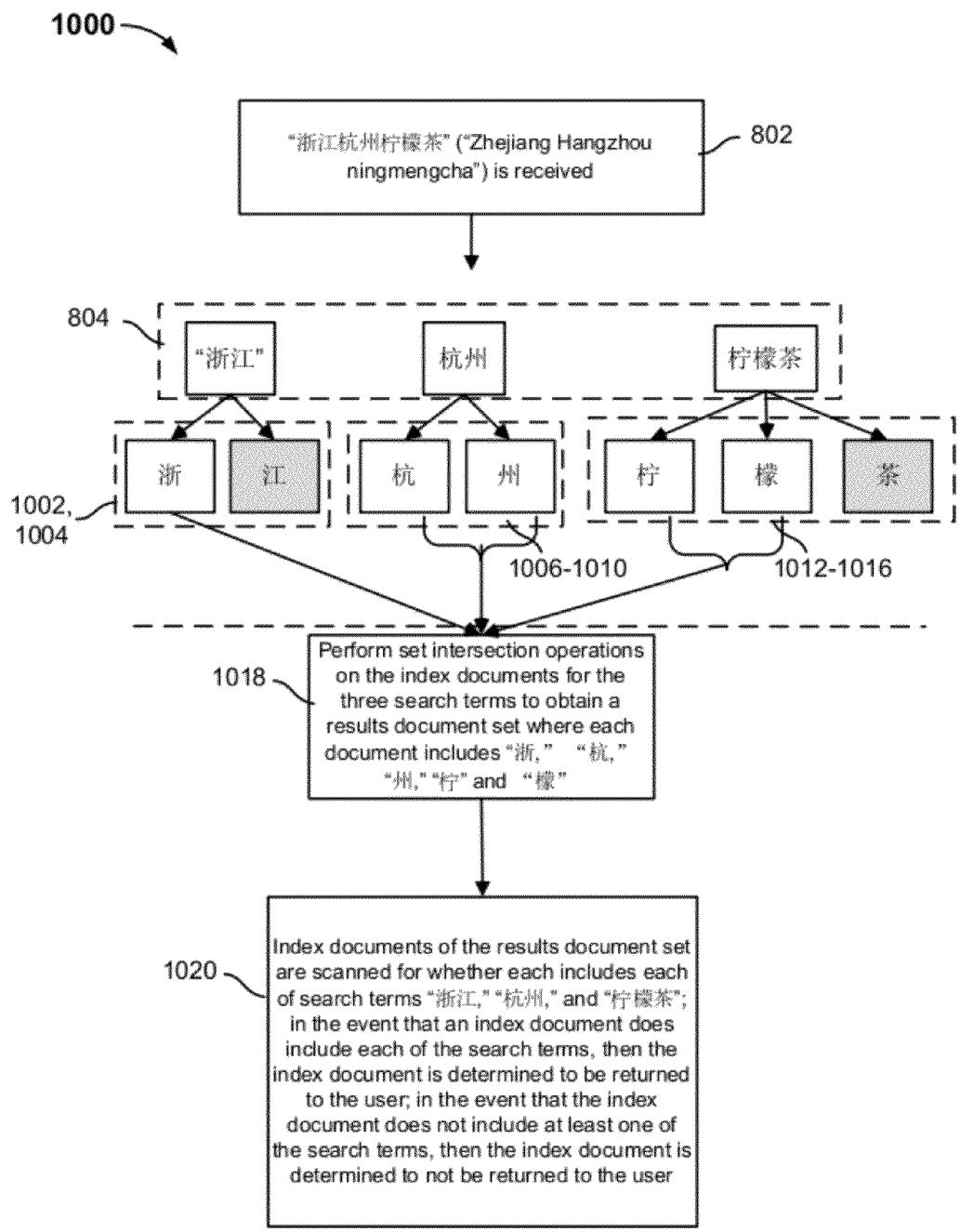
FIG. 10 is a diagram showing an example of a process for finding matching indexed documents.

FIG. 10 is a diagram showing an example of a process for finding matching indexed documents. In some embodiments, process 1000 is implemented at system 300.

Process 1000 shows a specific example of applying process 400. Process 1000 shows using a mix of different techniques of reducing the number of indexed documents on which set intersection operations are to be performed to produce more efficient searching. Process 1000 may be implemented with 802 and 804 of process 800 and where process 1000 would replace 806, 808, and 810 of process 800.

In this example, a user wishes to search for information on lemon tea in Hangzhou, Zhejiang. So the user inputs the Chinese search query of "浙江杭州柠檬茶" ("Zhejiang Hangzhou ningmengcha," meaning "Zhejiang Hangzhou lemon tea").

At 1002, index tables are queried for indexed documents that correspond to search characters "浙" ("Zhe") and "江" ("jiang") of search term "浙江" ("Zhejiang") to retrieve 10 indexed documents corresponding to "浙" ("Zhe") and 12 indexed documents corresponding to "江" ("jiang").

At 1004, for the search term "浙江" ("Zhejiang"), it is determined that the indexed document set corresponding to "浙" ("Zhe") is to comprise the search results for "浙江" ("Zhejiang") for having fewer indexed documents than the indexed document set for "江" ("jiang"). In this example, the addresses of the 10 documents of this search result are A1, A2, A3, A4, A7, A8, A10, A12, A11 and A20.

At 1006, index tables are queried for indexed documents that correspond to search characters "杭" ("Hang") and "州" ("zhou") for the search term "杭州" ("Hangzhou") to retrieve 8 indexed documents corresponding to "杭" ("Hang") and 10 indexed documents corresponding to "州" ("zhou").

At 1008, the indexed document sets retrieved for "杭州" ("Hangzhou") are divided into two groups. In this example, because there are only two sets of indexed document sets retrieved for the two search characters of "杭州" ("Hangzhou"), the first group will include the 8 indexed documents corresponding to "杭" ("Hang") and the second group will include the indexed documents corresponding to "州" ("zhou").

At 1010, a set intersection operation is performed on the first and second groups to obtain the two indexed documents that each includes both "杭" ("Hang") and "州" ("zhou"). In this example, the results yielded by performing a set intersection on the first and second groups are the two indexed documents located at addresses A1 and A3 that each includes both "杭" ("Hang") and "州" ("zhou").

At 1012, index tables are queried for indexed document sets that correspond to search characters "柠" ("ning"), "檬" ("meng"), and "茶" ("cha") of search term "柠檬茶" ("ningmengcha") and the retrieved three indexed document sets are divided into two groups, wherein the first group includes the indexed document set that corresponds to "柠" ("ning") and the indexed document set that corresponds to "檬" ("meng") and the second group includes the indexed document set that corresponds to "茶" ("cha").

At 1014, a set intersection operation is performed on the indexed document set that corresponds to "柠" ("ning") and the indexed document set that corresponds to "檬" ("meng") to obtain three indexed documents that each includes both "柠" ("ning") and "檬" ("meng"), wherein the three indexed documents comprise a first document set and wherein the indexed document set that corresponds to "茶" ("cha") comprise a second document set.

At 1016, the first document set is determined to comprise the search results for search term "柠檬茶" for being associated with fewer indexed documents than the second document associated with "茶" ("cha"). In this example, the three indexed documents of the first document set selected to serve as the search result for search term "柠檬茶" are located at addresses A1, A3 and A5.

At 1018, set intersection operations are performed on the search results for "浙江" ("Zhejiang"), "杭州" ("Hangzhou"), and "柠檬茶" ("ningmengcha") to obtain a set of results documents, wherein each indexed document of the results document set includes at least one instance of "浙" ("Zhe"), "杭" (Hang) "州" ("zhou"), and "柠" ("ning") "檬" ("meng"). In this example, the obtained results document set includes indexed document A1 and indexed document A3.

At 1020, a first indexed document of the results document set is scanned to determine whether the first indexed document includes each of search terms "浙江" ("Zhejiang"), "杭州" ("Hangzhou"), and "柠檬茶" ("ningmengcha"); in the event that the first indexed document does include each of the search terms, then the first indexed document is determined to be returned to the user; in the event that the first indexed document does not include at least one of the search terms, then the first indexed document is determined to not be returned to the user. Returning to the previous example, indexed documents A1 and A3 are each checked to determine whether the indexed document includes at least one instance of "浙江" ("Zhejiang"), "杭州" ("Hangzhou"), and "柠檬茶" ("ningmengcha"). If so, then the indexed document is determined to match the search query and returned to the user. Otherwise, if the indexed document does not include at least one of "浙江" ("Zhejiang"), "杭州" ("Hangzhou"), and "柠檬茶" ("ningmengcha"), then the indexed document is not returned to the user. In this example, it is determined that indexed documents A1 and A3 each includes all three search terms and so both indexed documents would be returned to the user.

In some embodiments, received search queries are checked for compliance with one or more preset grammar rules. In some embodiments, the preset grammar rules may be associated with one or more languages. In some embodiments, the same preset grammar rules may be associated with multiple search systems and/or different preset grammar rules may be associated with different search systems. In the event that a search query does not comply with the grammatical rules preset for the search system on which the search is being conducted, the search system may not return accurate search results. Therefore, a way of improving the searches described above includes checking for whether a received search query complies with preset grammar rules prior to finding indexed documents that match the search query. If the search query does not match one or more preset grammar rules, then the user will be prompted to resubmit a corrected search query. Processing of search queries generally may also include eliminating meaningless excess characters (such as blanks, arrows, and other such control characters) from the search queries. The following is an example of checking a search query for compliance with preset grammar rules:

The search query is read and compared against retrieved preset grammar rules. In the event that the search query does not comply with at least one grammar rule, an error will be generated and a prompt to resubmit the input is presented to the user. For example, a search query is: "search term 1 AND AND search term 2." Since no logical layer relationship is indicated between the two logic terms of "AND AND," this query does not comply with grammar rules. Thus, an error is reported and the user is requested to make a correction. If the resubmitted search query complies with the preset grammar rules, then the search query is subjected to a simplification treatment. For example, simplification treatment may include assessing whether the search query includes symbols other than logic terms and word characters. If so, then the additional symbols are eliminated. For example, if there are two spaces where there needs to be only one, then one space would be deleted from the search query. In some embodiments, the compliant and/or simplified search query may also be segmented based on the preset grammar rules.

In some embodiments, two or more search terms from a search query may be merged into one search term based on a user's search history. As a result of merging search terms, there are a fewer number of search terms and thus, a fewer number of search results on which set intersection operations are to be performed, which could increase efficiency of the search. In some embodiments, merging of the search terms may be performed prior to querying index tables for indexed documents corresponding to each search word of each search term.

Figure 11:
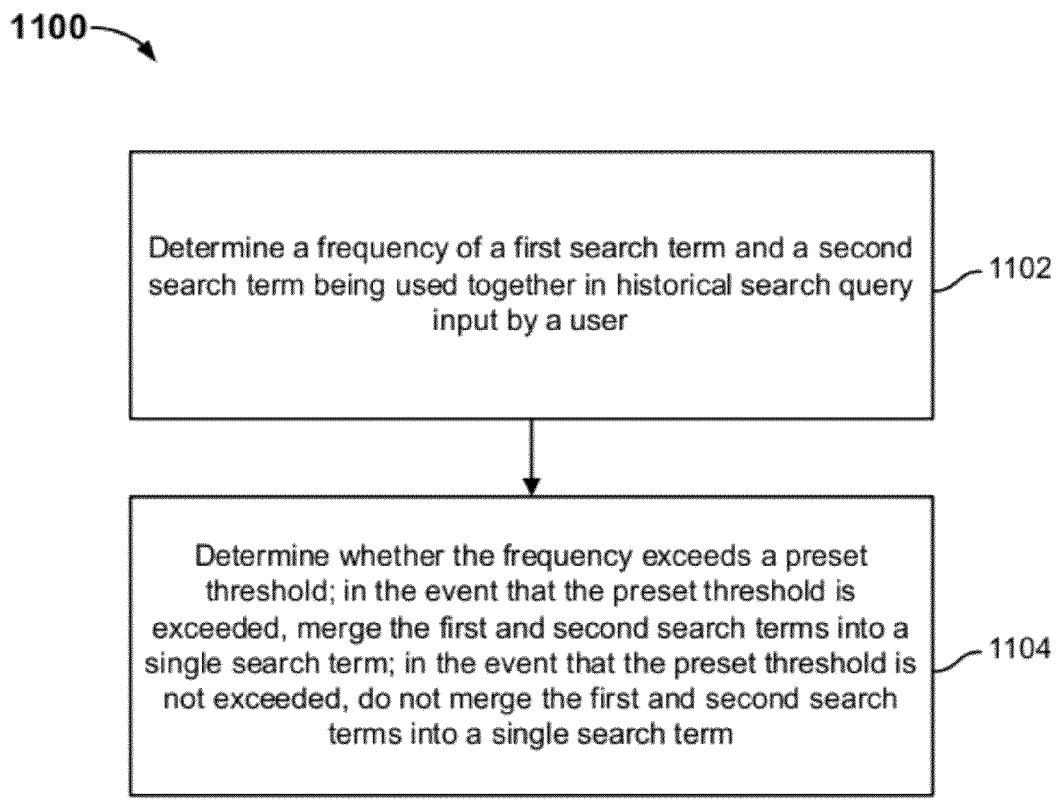
FIG. 11 is a flow diagram showing an example of using a user's search history to determine whether to merge two or more search terms into one single search term.

FIG. 11 is a flow diagram showing an example of using a user's search history to determine whether to merge two or more search terms into one single search term. In some embodiments, process 1100 may be implemented at system 300.

Process 1100 may be used to determine whether a first search term and a second search term segmented from a current search query input by a user should be merged into one single search term.

At 1102, a frequency of a first search term and a second search term being used together in historical search queries input by a user is determined. For example, the frequency may be determined by querying a user search history table that includes records of the frequency with which the first search term and the second search term have been used together in the same search query. In some embodiments, the user search history table may include only historical information associated with a specific user or with multiple different users.

At 1104, it is determined whether the frequency exceeds a preset threshold; in the event that the preset threshold is exceeded, the first and second search terms are merged into a single search term; in the event that the preset threshold is not exceeded, the first and second search terms are not merged into a single search term.

A user's search history can reflect the user's search tendencies and interests. A statistical analysis of the search history can help determine when it is appropriate to merge together search terms. If a review of the user's search history finds that search term 1 and search term 2 are regularly used together in searches by the user, then it is not necessary to treat search terms 1 and 2 as two independent search terms. Instead, these two search terms are merged into a single search term prior to retrieving the indexed document sets for each search term. Therefore, if the selection operation in processing the retrieved indexed documents included selecting the search term indexed document sets associated with the fewest indexed documents to serve as the search results for that search term, then what was originally 2 search terms now becomes 1, thus reducing the number of indexed documents of search results on which set intersection operations of various search terms are to be performed.

FIG. 12 is an example of a search history table to be used to determine whether search terms should be merged together. To give an example, assume that a user conducts a search using the Chinese search query "专利知识普及程度" ("zhuanli zhishi pujichengdu" meaning "patent knowledge dissemination level"). In accordance with the grammatical rules of Chinese grammar, the search query will be segmented into the following four search terms "专利" (patent), "知识" (knowledge), "普及" (dissemination), and "程度" (level). Without determining whether search terms should be merged, one indexed document set is selected from the indexed document sets retrieved for each of the four search terms to serve as the search result for that respective search term and set intersection operations would then be performed on the four sets of indexed documents. However, user's search histories may be used to merge at least some of the four search terms together. Referring to the search history table shown in FIG. 12, it is determined that the two search terms "专利" (patent) and "知识" (knowledge) were used together in 80% of historical searches; the two search terms "普及" (dissemination) and "程度" (level) were used together in 60% of searches. If the preset frequency threshold is 70%, then "专利" (patent) and "知识" (knowledge) are determined be merged into a single search term but not "普及" (dissemination) and "程度" (level). Following the merger, the search query will have only three search terms ("专利知识" (patent knowledge), "普及" (dissemination), and "程度" (level)), and so only three indexed document sets will need to be selected to serve as respective search results for the three search terms. Then, these three search results will undergo set intersection operations, thus reducing the number of indexed document sets within search results on which set intersection operations are to be performed.

In some embodiments, the basis of merging together search terms is not limited to user search history. For example, another basis for merging search terms may be predetermined language use correlation (e.g., unique relationships between two or more search terms). For example, if search term 3 is often used together with search term 4 based on predetermined language use correlation, then it is not necessary to treat search terms 3 and 4 as two independent search terms and instead, the two search terms may be merged together.

Figure 13:
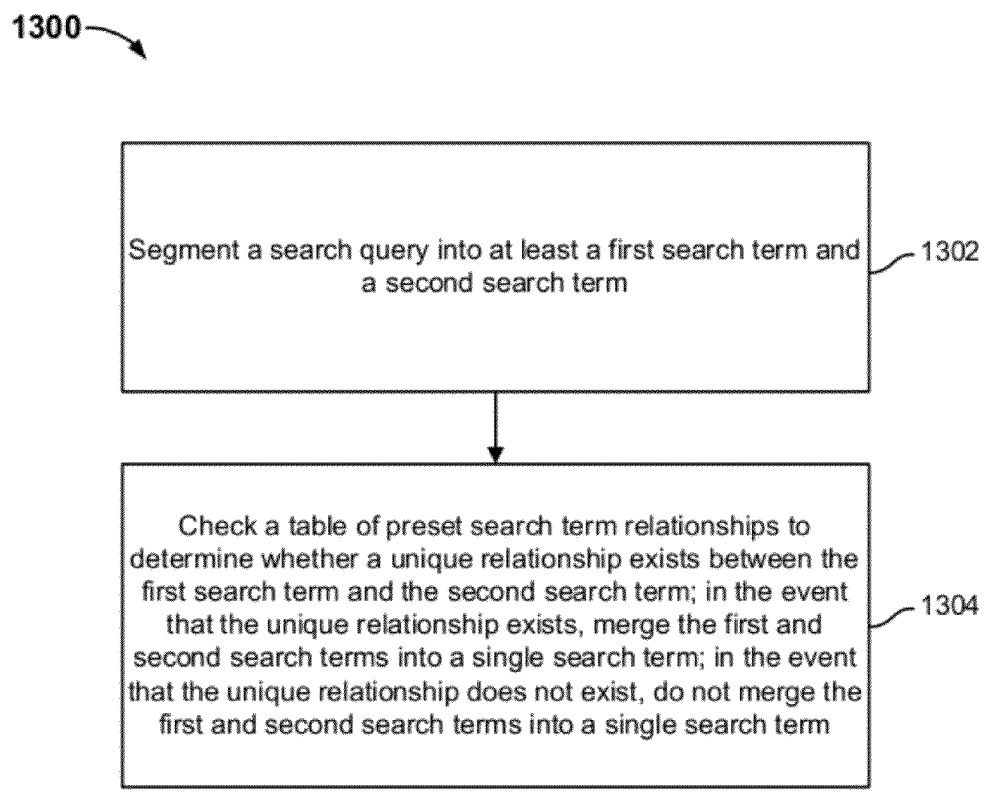
FIG. 13 is a flow diagram showing an example of using predetermined unique relationships between two or more search terms to determine whether to merge the two or more search terms into one search term.

FIG. 13 is a flow diagram showing an example of using predetermined unique relationships between two or more search terms to determine whether to merge the two or more search terms into one search term. In some embodiments, process 1300 may be implemented at system 300. In some embodiments, process 1300 may be added into process 400, subsequent to 404 and before 406.

At 1302, search term 1 and search term 2 are segmented from a search query.

At 1304, a table of preset unique search term relationships is checked to determine whether a unique relationship exists between the first search term and the second search term; in the event that the unique relationship exists, then the first and second search terms are merged into a single search term; in the event that the unique relationship does not exist, then the first and second search terms are not merged into a single search term.

For example, take the Chinese search query of "西藏布达拉宫" ("Xizang bu da la gong" meaning "Tibet Potala Palace"). This search query is segmented according to natural language rules into the following two search terms: "西藏" ("Tibet") and "布达拉宫" ("Potala Palace"). However, since it is common knowledge that there is only one Potala Palace, the modifier "西藏" ("Tibet") may be omitted. Therefore, these two search terms can be merged into the single search term "布达拉宫" ("Potala Palace").

In some embodiments, the search terms segmented from a search query are subjected to a normalization treatment. As used herein, normalization treatment is a language treatment which is performed on the search words of the search terms. In some embodiments, search terms are normalized such that they better match index characters/words of preset index tables so that indexed documents may be conveniently retrieved for the search characters/words. Sometimes, when index tables are created for a character/word search index system, the index characters/words that are used are in a predetermined conventional form. They do not vary as to tense, plurality, capitalization, and so on, that are found in natural language. Yet the search query input by the user might include search words that have slight variations from their index character/word counterparts. Therefore, to expedite the retrieval of indexed documents corresponding to the search words of the search terms, the search words may be normalized to match the form of the index characters/words. In some embodiments, search words are looked up in a dictionary and if search words are not in a normal form, then the search words are converted into the same normal form that is associated with index characters/words. Correspondences then may be established between normalized search words and their matching index characters/words such that for a search word, the set of indexed documents that correspond to their matching index characters/words is retrieved. For example, the user inputs "GO," "went," "go," and other such search term elements in a search query. However, only "go" are indexed characters/words, so "GO" and "went" would be ignored and no indexed documents will be retrieved for them. This will inevitably lead to search errors. Therefore, it is necessary to establish a correspondence between "GO" and "went" and the index characters/words "go" so that the indexed document set associated with index characters/words "go" will also be retrieved for equivalent search words "GO" and "went."

In some embodiments, the result indexed documents that are determined to be returned to the user in response to the user's search query are ranked first. In some embodiments, ranking comprises computing the weights of word combinations in the indexed documents, computing a document correlation score for each indexed document based on the computed weights associated with word combinations, and ranking the indexed document based on the document correlation scores. An example of the ranking process is as follows:

First step: a word combination weight is determined for each word combination included in an indexed document. Generally, the higher the frequency that a word combination appears within a single document (word combination frequency, denoted as "tf"), the more important this word combination is considered to be, and the lower the frequency, the less important this word combination is considered to be. As a result, high-frequency word combinations are weighted more and play a larger role in computing inter-document correlation scores. Within the results indexed documents that are to be returned to the user, the higher frequency that a word combination appears within any of the documents (document frequency, denoted as "df"), the less important this word combination is because the word combination might be excessively common and insufficient for differentiating these documents.

The following is an example formula used to determine the word combination weight of a word combination:

$$w_{t,d} = tf_{t,d} \times \log\left(\frac{n}{df_t}\right) \quad (1)$$

The $tf_{t,d}$ component refers to the frequency of the $t^{th}$ word combination in document d; $df_t$ refers to the number of documents that include the $t^{th}$ word combination; n refers to the total number of documents; $w_{t,d}$ refers to the weight of the $t^{th}$ word combination in document d.

Formula (1) is just one possible formula to use to determine the word combination weight and any other appropriate formula may also be used.

Second step: the document correlation score of each of the indexed documents to a search query (e.g., search query) is computed. Although many techniques exist for computing document correlations, for illustrative purposes, the vector space model (VSM) technique is used in this example. Generally, the document correlation is determined based on the importance of the word combinations included in that document.

A document can be thought of as being composed of a series of word combinations. Each word combination has a corresponding weight computed with the technique described above. The word combinations can affect the document correlation score of a document based on their respective weights in that document. The weights of all word combinations in a document may define a vector:

Document={combo1, combo2, . . . , combo N}
Document vector={weight1, weight2, . . . , weight N}

A query may likewise be thought of as a simple document, and its vectors are represented as below:

Query={term1, term 2, . . . , term N}
Query vector={weight1, weight2, . . . , weight N}

Figure 14:
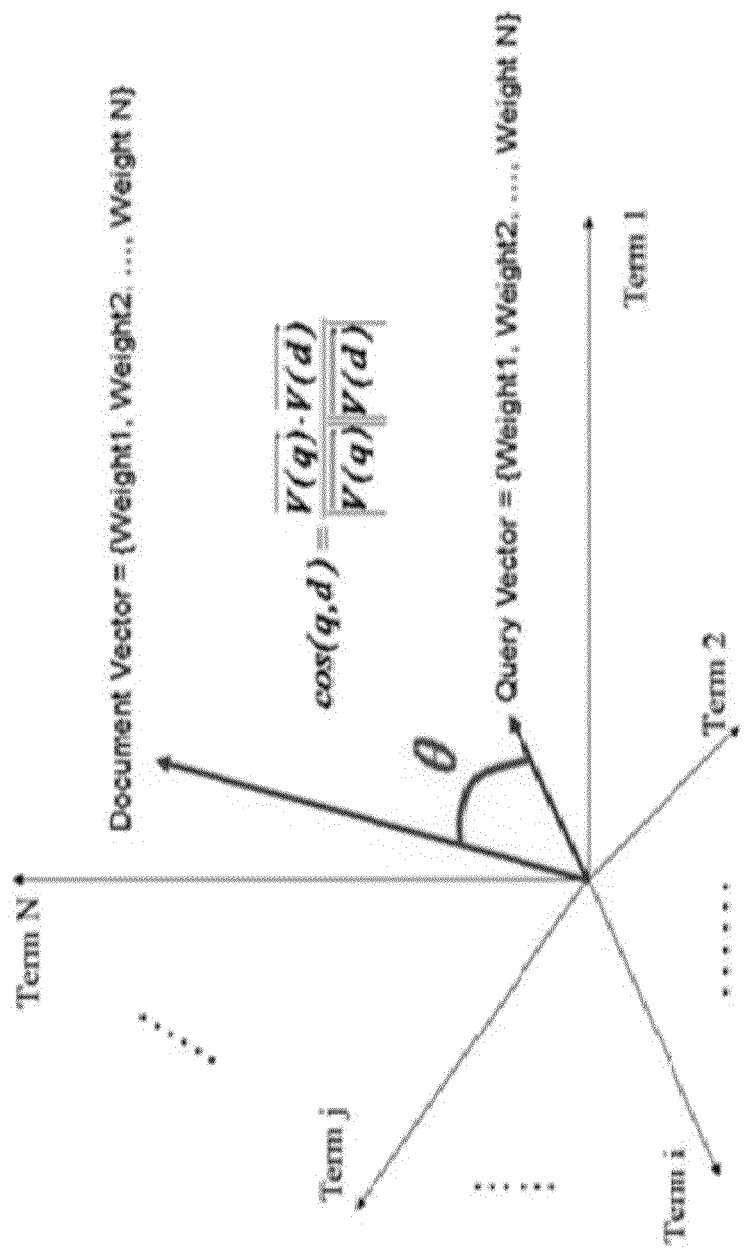
FIG. 14 is an example of plotting a document vector and a query vector in N-dimensional space.

FIG. 14 is an example of plotting a document vector and a query vector in N-dimensional space. As shown in the example, an angle (∠) may be determined between the document and query vectors. The smaller the angle formed by two vectors, the greater the document's correlation to the search query is. Therefore, scores may be assigned for document correlations by computing the cosines of the angles between the two vectors. The smaller the angle, the larger the value of the cosine, the higher the score, and the greater the correlation. The following is an example formula used to determine the document correlation score of a document:

$$\text{score}(q, d) = \frac{\vec{V}_q \cdot \vec{V}_d}{|\vec{V}_q||\vec{V}_d|} = \frac{\sum_{i=1}^{n} w_{i,q} w_{i,d}}{\sqrt{\sum_{i=1}^{n} w_{i,q}^2} \sqrt{\sum_{i=1}^{n} w_{i,d}^2}}$$

Vector $V_q$ is the vector constructed from the weights of each search word in the search query q; vector $V_d$ is the vector constructed from the weights of each word combination contained in document d; $W_{i,q}$ refers to the weight of the $i^{th}$ search word in search query q; W refers to the weight of the $i^{th}$ word combination in document d; score (q, d) refers to the correlation score when search query q is used to search and obtain document d.

Third step: the indexed documents are ranked by their respective document correlation scores. Indexed documents may be returned and/or presented to the user based on their respective rankings.

Figure 15:
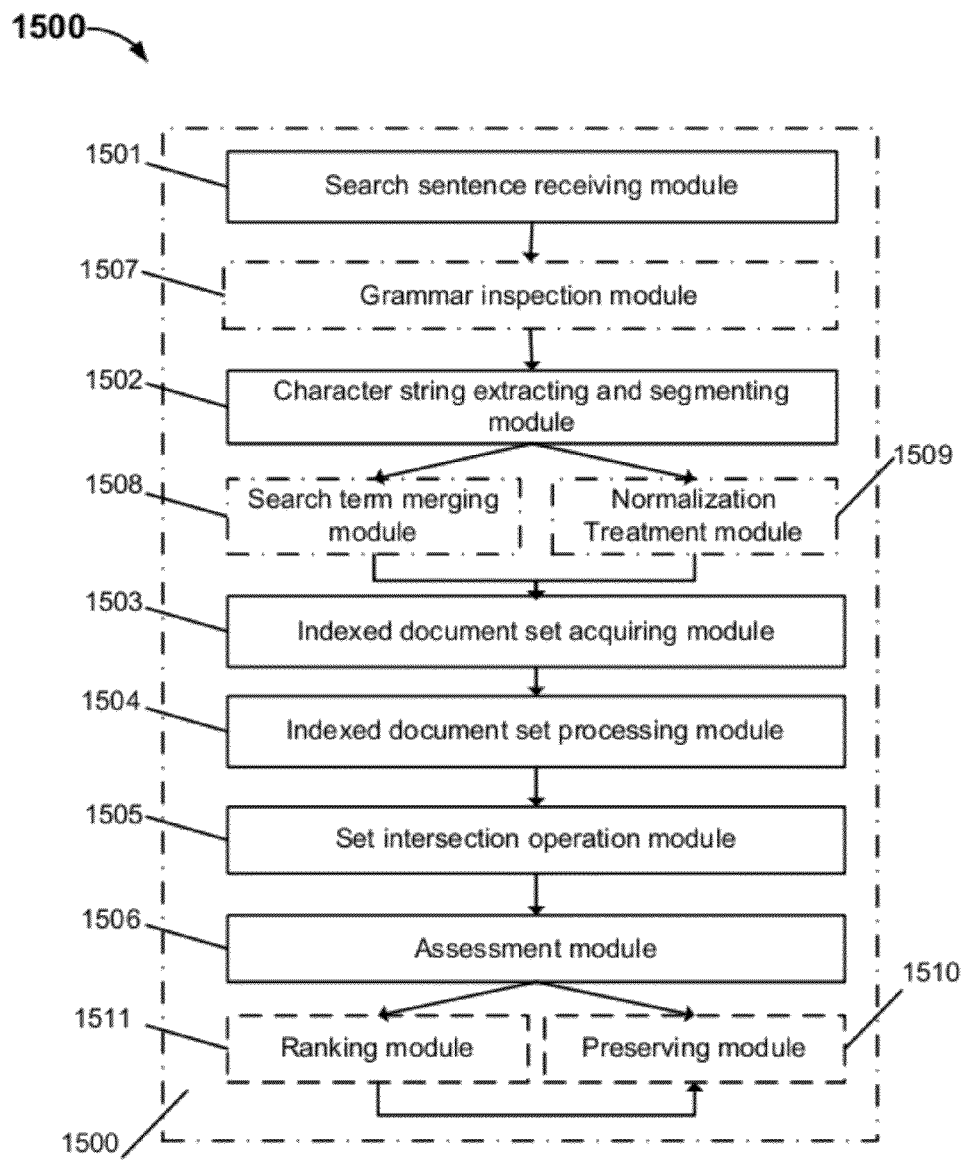
FIG. 15 is a diagram showing an embodiment of a system for finding matching indexed documents.

FIG. 15 is a diagram showing an embodiment of a system for finding matching indexed documents.

The modules and sub-modules can be implemented as software components executing on one or more processors, as hardware such as programmable logic devices and/or Application Specific Integrated Circuits designed to perform certain functions, or a combination thereof. In some embodiments, the modules and sub-modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and sub-modules may be implemented on a single device or distributed across multiple devices.

In this example, system 1500 includes: search query receiving module 1501, word string extracting and segmenting module 1502, indexed document set acquiring module 1503, indexed document set processing module 1504, set intersection operation module 1505, and assessment module 1506.

Search query receiving module 1501 is configured to receive search queries input by users.

Character string extracting and segmenting module 1502 is configured to extract a character string from each search query and segment the character string into one or more search terms, wherein each search term includes one or more search words.

Indexed document set acquiring module 1503 is configured to query index tables to acquire indexed document sets corresponding to the search words included in each of the search terms.

Indexed document set processing module 1504 is configured to process the acquired indexed document sets associated with each search term including by selecting a subset of all of the indexed document sets retrieved for that search term to perform on. The processing results for each search term are referred to as the search results for that search term.

Set intersection operation module 1505 is configured to perform set intersection operations on the search results for each of the search terms and to generate a results document set.

Assessment module 1506 is configured to determine whether each of the indexed documents in the results document set includes all of the search terms of the search query. Only those indexed documents of the results document set that includes all the search terms are returned to the querying user.

In some embodiments, system 1500 is configured to operate as follows: After search query receiving module 1501 receives a search query input by a user, it transmits the sentence to character string extracting and segmenting module 1502. After character string extracting and segmenting module 1502 extracts a character string from the search query, it subjects the character string to search term segmentation in accordance with natural grammar rules. The search terms include search words, which may be single words, word combinations, and/or phrases. After the search term segmentation has been completed, indexed document set acquiring module 1503 queries an index table according to the search words of the search terms and acquires the corresponding indexed document sets. Then indexed document set processing module 1504 processes the acquired indexed document sets, including by selecting a subset of all of the acquired indexed document sets to process. Indexed document set processing module 1504 also determines that the result of processing the selected subset of indexed document sets for a search term comprises the search results for that search term. The search results of the search terms are input into set intersection operation module 1505, which conducts set intersection operations on the received search results to generate a results document set, which it sends to assessment module 1506. Assessment module 1506 determines whether each of the indexed documents in the results document set includes all of the search terms of the search query. Only those indexed documents of the results document set that includes all the search terms are returned to the querying user.

Indexed document set processing module 1504 may use many different types of processing techniques. The different techniques may correspond to different specific structures. For example, system 1500 may further include: an indexed document quantity comparing sub-module and an indexed document set selecting sub-module. The indexed document quantity comparing sub-module is configured to compare the number of indexed documents in each indexed document set retrieved for a search term. The indexed document set selecting sub-module is configured to select the indexed document set having the fewest indexed documents to serve as the processing results for that search term.

Figure 16:
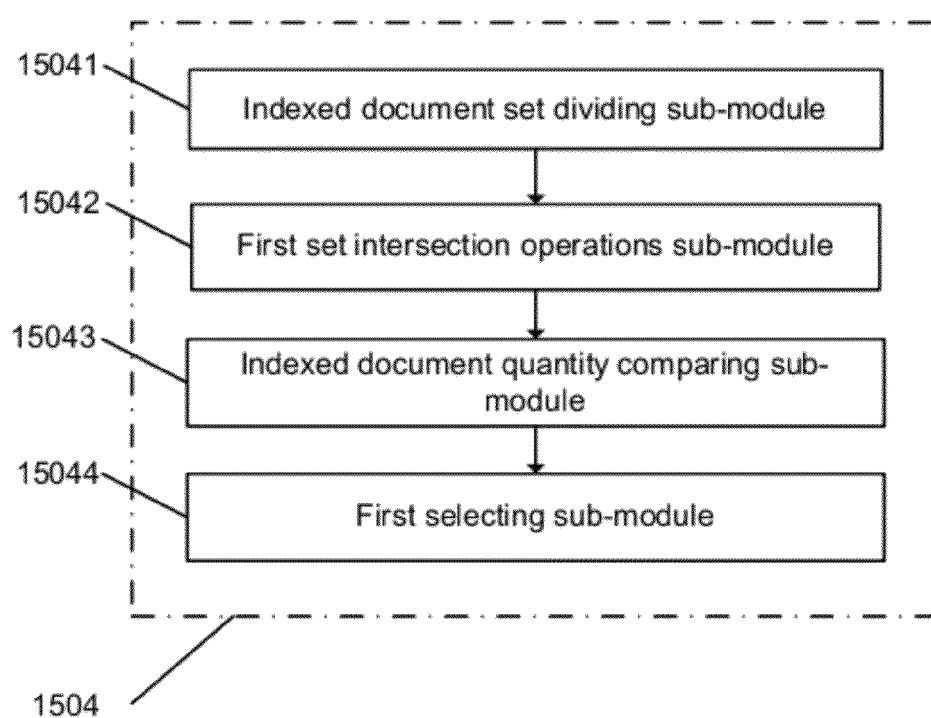
FIG. 16 is a diagram showing an embodiment of indexed document set processing module 1504 of system 1500.

FIG. 16 is a diagram showing an embodiment of indexed document set processing module 1504 of system 1500. In the example, indexed document set processing module 1504 includes indexed document set dividing sub-module 15041, first set intersection operations sub-module 15042, indexed document quantity comparing sub-module 15043, and first selecting sub-module 15044.

Indexed document set dividing sub-module 15041 is configured to divide the indexed document sets of a search term into at least two groups.

First set intersection operations sub-module 15042 is configured to perform set intersection operations on the indexed document sets within each group to obtain each group's set intersection operation results document set.

Indexed document quantity comparing sub-module 15043 is configured to compare the number of indexed documents in the set intersection operation results document set of each group to each other.

First selecting sub-module 15044 is configured to select the set intersection operation results document set that has the fewest indexed documents to serve as the processing result for that search term.

In another embodiment, indexed document set processing module 1504 may further include: an indexed document set dividing sub-module, an indexed document quantity comparing sub-module, a second selecting sub-module, and a second set intersection operation sub-module, where the indexed document set dividing sub-module is configured to divide the indexed document sets of a search term into at least two groups; the indexed document quantity comparing sub-module is configured to compare the number of indexed documents in the indexed document sets within each group; the second selecting sub-module is for selecting the indexed document set having the fewest indexed documents to serve as the selection result document set for the group; the second set intersection operation sub-module is configured to subject the selection result document set of each of the groups to set intersection operations and use the set intersection operation results as processing results for the search term. These two embodiments differ in the following way: the selection operation and the set intersection operation(s) are sequenced differently. Indexed document set processing module 1504 may first perform set intersection operations on indexed document sets retrieved for a search term that have been divided into smaller groups and then perform a selection operation on the set intersection operation results for the groups. Indexed document set processing module 1504 also performs selection operations on indexed document sets retrieved for a search term that have been divided into smaller groups and then performs set intersection operations on the selection result document sets of each group.

Returning to FIG. 15, system 1500 may further include grammar inspection module 1507. Grammar inspection module includes grammar checking and simplification processing. System 1500 may also include search term merging module 1508 for merging segmented search terms according to preset rules. System 1500 may also include normalization treatment module 1509 for performing a language treatment on search queries and search terms. System 1500 may also include preserving module 1510 for preserving documents sent back for assessment by the assessment module 1506. Preservation media can be network hard drives, mail boxes, and other external storage equipment. System 1500 may also include ranking module 1511 configured to rank the documents which were assessed by assessment module 1506 and determined to include each search term.

Figure 17:
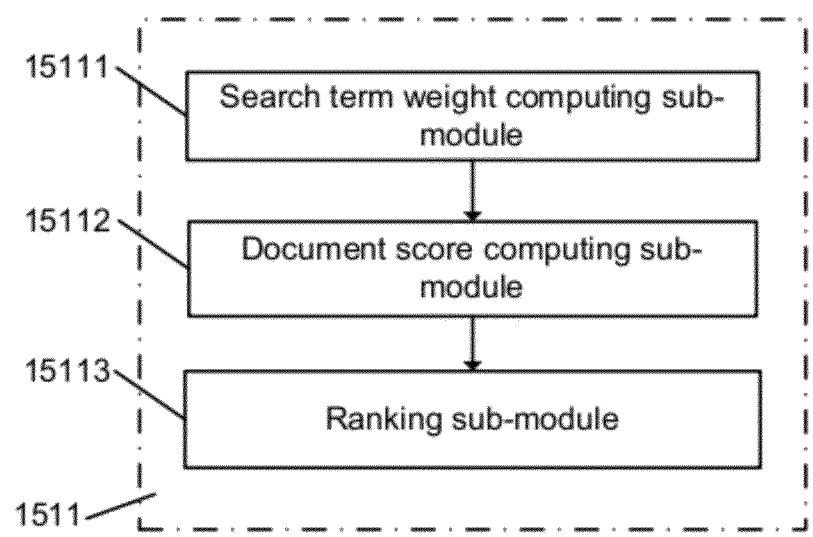
FIG. 17 is a diagram showing an example of ranking module 1511 of system 1500.

FIG. 17 is a diagram showing an example of ranking module 1511 of system 1500. In the example, ranking module 1511 may include search term weight computing sub-module 15111 that is configured to compute the weight of each search term based on the frequency that the search term appears in the returned documents of the results document set; document score computing sub-module 15112 is configured to compute document correlation scores of the sent back documents based on the computed weights; ranking sub-module 15113 is configured to rank the returned documents according to their respective document scores.

The embodiments of the present invention described above do not constitute a limit on the scope of protection of the present invention. Any modifications, equivalent substitutions, or improvements made within the spirit and principles of the present invention shall be under the protection of the claims of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for finding indexed documents, comprising:
one or more processors configured to:
 receive a search query;
 extract a character string from the search query and segment the character string into a plurality of search terms, wherein each search term comprises one or more search words;
 retrieve indexed document sets corresponding to search words, the search words being included in the plurality of search terms;
 process the retrieved indexed document sets associated with the plurality of search terms based at least in part on selection operations performed on individual search terms of the plurality of search terms, wherein a selection operation on an individual search term indicates which subset of all indexed documents retrieved for the individual search term is to be processed, wherein the selection operation on the individual search term includes comparing the retrieved indexed document sets for the individual search term and selecting the retrieved indexed document set associated with a fewest number of indexed documents to generate a set of one or more search results for the individual search term;
 perform set intersection operations on sets of search results corresponding to the plurality of search terms to generate a results document set; and
 determine and return a first subset of indexed documents of the results document set, wherein an indexed document of the first subset includes the plurality of search terms; and
one or more memories coupled to the one or more processors and configured to provide the one or more processors with instructions.

2. The system of claim 1, wherein to process the retrieved indexed document sets associated with the plurality of search terms includes to:
 divide indexed document sets retrieved for the search words belonging to the individual search term into a first group and a second group;
 perform set intersection operations on one or more indexed documents of the first group to produce a first document set and one or more indexed documents of the second group to produce a second document set; and
 select whichever of the first document set and the second document set that is associated with the fewest number of indexed documents to comprise the search results for the individual search term.

3. The system of claim 1, wherein to process the retrieved indexed document sets associated with the plurality of search terms includes to:
 divide indexed document sets retrieved for the search words belonging to a first search term into a first group and a second group;
 select a first indexed document set from the first group and a second indexed document set from the second group; and perform set intersection operations on the first and second indexed document sets and determine results of the set intersection operations to comprise search results for the first search term.

4. The system of claim 1, wherein at least a subset of indexed document sets corresponding to search words included in the plurality of search terms is retrieved by querying one or more preset index tables that indicate indexed documents that correspond to one or more index words.

5. The system of claim 1, wherein the individual search term comprises one or more of the following: a phrase, a saying, an idiom, a short sentence, and a word combination.

6. The system of claim 1, wherein the individual search term is a first search term; and the one or more processors are further configured to:
prior to retrieving indexed document sets corresponding to search words included in the plurality of search terms, merge the first search term from the plurality of search terms with a second search term from the plurality of search terms into a single search term.

7. The system of claim 6, wherein to merge the first search term and the second search term includes to:
determine a frequency of the first search term and the second search term being used together in historical search queries input by a user; and
determine whether the frequency exceeds a preset threshold; in the event that the preset threshold is exceeded, merge the first and second search terms into a single search term; in the event that the preset threshold is not exceeded, do not merge the first and second search terms into a single search term.

8. The system of claim 6, wherein to merge the first search term and the second search term includes to:
check a table of preset unique search term relationships to determine whether a unique relationship exists between the first search term and the second search term; in the event that the unique relationship exists, merge the first and second search terms into a single search term; in the event that the unique relationship does not exist, do not merge the first and second search terms into a single search term.

9. The system of claim 1, wherein the one or more processors are further configured to rank indexed documents in the first subset including by:
computing a word combination weight for each word combination included in an indexed document;
computing a document correlation score for each indexed document based on the computed word combination weights associated with word combinations present in the indexed document; and
ranking the indexed documents in the first subset based on the corresponding document correlation scores.

10. The system of claim 1, wherein at least one of the one or more search words comprises a search character.

11. A method for finding indexed documents, comprising:
receiving a search query;
extracting a character string from the search query and segmenting the character string into a plurality of search terms, wherein each search term comprises one or more search words;
retrieving indexed document sets corresponding to search words, the search words being included in the plurality of search terms;
processing the retrieved indexed document sets associated with the plurality of search terms based at least in part on selection operations performed on individual search terms of the plurality of search terms, wherein a selection operation on an individual search term indicates which subset of all indexed documents retrieved for the individual search term is to be processed, wherein the selection operation on the individual search term includes comparing the retrieved indexed document sets for the individual search term and selecting the retrieved indexed document set associated with a fewest number of indexed documents to generate a set of one or more search results for the individual search term;
performing set intersection operations on sets of search results corresponding to the plurality of search terms to generate a results document set; and
determining and returning a first subset of indexed documents of the results document set, wherein an indexed document of the first subset includes the plurality of search terms.

12. The method of claim 11, wherein processing the retrieved indexed document sets associated with the plurality of search terms includes:
dividing indexed document sets retrieved for the search words belonging to the individual search term into a first group and a second group;
performing set intersection operations on one or more indexed documents of the first group to produce a first document set and one or more indexed documents of the second group to produce a second document set; and
selecting whichever of the first document set and the second document set that is associated with the fewest number of indexed documents to comprise the search results for the individual search term.

13. The method of claim 11, wherein processing the retrieved indexed document sets associated with the plurality of search terms includes:
dividing indexed document sets retrieved for the search words belonging to a first search term into a first group and a second group;
selecting a first indexed document set from the first group and a second indexed document set from the second group; and
performing set intersection operations on the first and second indexed document sets and determining results of the set intersection operations to comprise search results for the individual search term.

14. The method of claim 11, further comprising:
prior to retrieving indexed document sets corresponding to search words included in the plurality of search terms, merging a first search term from the plurality of search terms with a second search term from the plurality of search terms into a single search term.

15. The method of claim 14, wherein merging the first search term and the second search term includes:
determining a frequency of the first search term and the second search term being used together in historical search queries input by a user; and
determining whether the frequency exceeds a preset threshold; in the event that the preset threshold is exceeded, merging the first and second search terms into a single search term; in the event that the preset threshold is not exceeded, not merging the first and second search terms into a single search term.

16. The method of claim 14, wherein merging the first search term and the second search term includes:
checking a table of preset unique search term relationships to determine whether a unique relationship exists between the first search term and the second search term; in the event that the unique relationship exists, merging the first and second search terms into a single search term; in the event that the unique relationship does not exist, not merging the first and second search terms into a single search term.

17. The method of claim 11, further comprising:
computing a word combination weight for each word combination included in an indexed document;
computing a document correlation score for each indexed document based on the computed word combination weights associated with word combinations present in the indexed document; and
ranking the indexed documents in the first subset based on the corresponding document correlation scores.

18. A non-transitory computer readable storage medium for finding indexed documents comprising computer instructions for:
receiving a search query;
extracting a character string from the search query and segmenting the character string into a plurality of search terms, wherein each search term comprises one or more search words;
retrieving indexed document sets corresponding to search words, the search words being included in the plurality of search terms;
processing the retrieved indexed document sets associated with the plurality of search terms based at least in part on selection operations performed on individual search terms of the plurality of search terms, wherein a selection operation on an individual search term indicates which subset of all indexed documents retrieved for the individual search term is to be processed, wherein the selection operation on the individual search term includes comparing the retrieved indexed document sets for the individual search term and selecting the retrieved indexed document set associated with a fewest number of indexed documents to generate a set of one or more search results for the individual search term;
performing set intersection operations on sets of search results corresponding to the plurality of search terms to generate a results document set; and
determining and returning a first subset of indexed documents of the results document set, wherein an indexed document of the first subset includes the plurality of search terms.

* * * * *